(12) United States Patent
Wine et al.

(10) Patent No.: US 11,519,433 B2
(45) Date of Patent: Dec. 6, 2022

(54) SYSTEMS AND METHODS FOR ACTIVE CONTROL OF SURFACE DRAG USING WALL COUPLING

(71) Applicant: Deep Science, LLC, Bellevue, WA (US)

(72) Inventors: David William Wine, Seattle, WA (US); Ivan Marusic, Essendon (AU); Alexander J. Smits, Princeton, NJ (US); Brian C. Holloway, Snoqualmie, WA (US)

(73) Assignee: Deep Science, LLC, Bellevue, WA (US)

( * ) Notice: Subject to any disclaimer, the term of this patent is extended or adjusted under 35 U.S.C. 154(b) by 537 days.

(21) Appl. No.: 16/674,870

(22) Filed: Nov. 5, 2019

(65) Prior Publication Data

US 2020/0191177 A1 Jun. 18, 2020

Related U.S. Application Data

(60) Provisional application No. 62/756,456, filed on Nov. 6, 2018.

(51) Int. Cl.
*B64C 21/00* (2006.01)
*F15D 1/00* (2006.01)
(Continued)

(52) U.S. Cl.
CPC ........... *F15D 1/007* (2013.01); *F15D 1/0075* (2013.01); *F15D 1/12* (2013.01); *B64C 21/10* (2013.01); *Y02T 50/10* (2013.01)

(58) Field of Classification Search
CPC .......... F15D 1/007; F15D 1/0075; F15D 1/12; Y02T 50/10; B64C 21/10
(Continued)

(56) References Cited

U.S. PATENT DOCUMENTS

| 1,903,823 A | 4/1933 | Lougheed |
| 2,440,198 A | 4/1948 | Green |

(Continued)

FOREIGN PATENT DOCUMENTS

| EP | 1 481 467 B1 | 12/2004 |
| EP | 2 012 139 A1 | 1/2009 |

(Continued)

OTHER PUBLICATIONS

International Search Report on PCT/US2019/059919, dated Apr. 15, 2020, 17 pages.
(Continued)

*Primary Examiner* — Minh Q Le
(74) *Attorney, Agent, or Firm* — Foley & Lardner LLP

(57) ABSTRACT

A system includes a surface having a fluid flowing over the surface. The fluid includes a flow regime having a streamwise length scale greater than about 100 times η and less than about 100,000 times η, where η is a viscous length scale of the flow regime, and a convective time scale greater than about 10η' and less than about 10,000η', where η' is a viscous time scale of the flow regime. The system includes a controller that causes at least one of motion the surface to modify fluid flow in the flow regime based on the streamwise length scale and the convective time scale or motion of the flow regime based on the streamwise length scale and the convective time scale.

20 Claims, 16 Drawing Sheets

(51) Int. Cl.
*F15D 1/12* (2006.01)
*B64C 21/10* (2006.01)

(58) Field of Classification Search
USPC ........... 137/803; 244/205, 199.1, 200.1, 201, 244/203, 204, 99.8, 200
See application file for complete search history.

(56) References Cited

U.S. PATENT DOCUMENTS

| | | | |
|---|---|---|---|
| 3,289,978 A | 12/1966 | Banaszak | |
| 3,578,264 A | 5/1971 | Kuethe | |
| 4,102,519 A | 7/1978 | Crosby, Jr. | |
| 4,309,901 A | 1/1982 | Rolinski et al. | |
| 4,516,747 A | 5/1985 | Lurz | |
| 4,526,031 A | 7/1985 | Weisend et al. | |
| 4,611,492 A | 9/1986 | Koosmann | |
| 4,932,612 A * | 6/1990 | Blackwelder | B64C 21/04 244/209 |
| 5,037,044 A | 8/1991 | Seyfang | |
| 5,106,017 A | 4/1992 | Hicks | |
| 5,209,438 A * | 5/1993 | Wygnanski | B64C 23/00 244/200.1 |
| 5,359,574 A | 10/1994 | Nadolink | |
| 5,365,490 A | 11/1994 | Katz | |
| 5,369,345 A | 11/1994 | Phan et al. | |
| 5,374,011 A | 12/1994 | Lazarus et al. | |
| 5,445,346 A | 8/1995 | Gilbert | |
| 5,531,407 A | 7/1996 | Austin et al. | |
| 5,540,406 A | 7/1996 | Occhipinti | |
| 5,558,156 A | 9/1996 | Tsutsui | |
| 5,558,304 A | 9/1996 | Adams | |
| 5,598,990 A * | 2/1997 | Farokhi | B64C 23/06 296/180.1 |
| 5,755,408 A | 5/1998 | Schmidt et al. | |
| 5,808,210 A | 9/1998 | Herb et al. | |
| 5,874,671 A | 2/1999 | Lopez | |
| 5,942,682 A | 8/1999 | Ghetzler et al. | |
| 5,953,773 A | 9/1999 | Asada et al. | |
| 5,957,413 A | 9/1999 | Glezer et al. | |
| 5,961,080 A | 10/1999 | Sinha | |
| 5,964,433 A | 10/1999 | Nosenchuck | |
| 5,988,522 A | 11/1999 | Glezer et al. | |
| 5,988,568 A | 11/1999 | Drews | |
| 6,016,286 A | 1/2000 | Olivier et al. | |
| 6,024,119 A * | 2/2000 | Kirschner | B63B 1/36 114/67 R |
| 6,109,565 A | 8/2000 | King, Sr. | |
| 6,123,145 A | 9/2000 | Glezer et al. | |
| 6,123,296 A * | 9/2000 | Mangalam | B64C 21/10 244/206 |
| 6,131,853 A | 10/2000 | Bauer et al. | |
| 6,215,221 B1 | 4/2001 | Cabuz et al. | |
| 6,332,593 B1 | 12/2001 | Kamiadakis et al. | |
| 6,443,394 B1 | 9/2002 | Weisend, Jr. | |
| 6,484,971 B2 | 11/2002 | Layukallo | |
| 6,573,012 B1 | 6/2003 | Lee et al. | |
| 6,598,990 B2 | 7/2003 | Li | |
| 6,640,995 B2 | 11/2003 | Jepson | |
| 6,644,598 B2 | 11/2003 | Glezer et al. | |
| 6,662,647 B2 | 12/2003 | Schoess et al. | |
| 6,795,763 B2 | 9/2004 | Yao et al. | |
| 6,821,090 B1 | 11/2004 | Hassan et al. | |
| 6,862,502 B2 | 3/2005 | Peltz et al. | |
| 6,871,816 B2 | 3/2005 | Nugent et al. | |
| 6,874,748 B2 | 4/2005 | Hanagan | |
| 6,966,231 B2 | 11/2005 | Sheplak et al. | |
| 6,979,050 B2 | 12/2005 | Browne et al. | |
| 7,031,871 B2 | 4/2006 | Severson et al. | |
| 7,133,785 B2 | 11/2006 | Larson et al. | |
| 7,204,731 B2 | 4/2007 | Gusler | |
| 7,251,592 B1 | 7/2007 | Praisner et al. | |
| 7,375,911 B1 | 5/2008 | Li et al. | |
| 7,380,756 B1 | 6/2008 | Enloe et al. | |
| 7,434,170 B2 | 10/2008 | Novak et al. | |
| 7,537,182 B2 | 5/2009 | Greenblatt | |
| 7,703,839 B2 | 4/2010 | McKnight et al. | |
| 7,854,467 B2 | 12/2010 | McKnight et al. | |
| 7,913,928 B2 | 3/2011 | Tiliakos et al. | |
| 8,006,939 B2 | 8/2011 | McClure et al. | |
| 8,074,938 B2 | 12/2011 | Hyde et al. | |
| 8,074,939 B2 | 12/2011 | Hyde et al. | |
| 8,091,950 B2 | 1/2012 | Corke et al. | |
| 8,267,355 B1 | 9/2012 | Patel et al. | |
| 8,286,909 B2 * | 10/2012 | Lee | B64B 1/30 244/65 |
| 8,308,112 B2 | 11/2012 | Wood et al. | |
| 8,436,509 B1 | 5/2013 | Branch | |
| 8,783,337 B2 * | 7/2014 | Hyde | F28F 27/00 73/147 |
| 8,794,574 B2 | 8/2014 | Lang | |
| 8,894,019 B2 * | 11/2014 | Alvi | F15D 1/008 244/200.1 |
| 9,002,484 B2 | 4/2015 | Hyde et al. | |
| 9,410,527 B2 * | 8/2016 | Hsu | F03D 5/00 |
| 9,541,106 B1 | 1/2017 | Patel et al. | |
| 9,640,995 B2 | 5/2017 | Thorburn | |
| 9,834,301 B1 | 12/2017 | Patel et al. | |
| 9,848,485 B2 | 12/2017 | Corke et al. | |
| 9,883,822 B2 | 2/2018 | Bhagavat et al. | |
| 9,908,616 B1 | 3/2018 | Horn et al. | |
| 10,527,074 B2 | 1/2020 | Corke et al. | |
| 10,543,908 B2 | 1/2020 | Stefes et al. | |
| 11,299,260 B2 | 4/2022 | Wine et al. | |
| 2002/0079405 A1 * | 6/2002 | Layukallo | B64C 21/00 244/130 |
| 2002/0131474 A1 | 9/2002 | Suga | |
| 2004/0197519 A1 | 10/2004 | Elzey et al. | |
| 2004/0249257 A1 | 12/2004 | Tupin et al. | |
| 2005/0088057 A1 | 4/2005 | Kando | |
| 2005/0121240 A1 | 6/2005 | Aase et al. | |
| 2005/0163963 A1 * | 7/2005 | Munro | B64C 21/10 428/88 |
| 2005/0241605 A1 | 11/2005 | Bedwell et al. | |
| 2006/0022092 A1 | 2/2006 | Miller et al. | |
| 2006/0040532 A1 | 2/2006 | Ozawa et al. | |
| 2006/0060722 A1 | 3/2006 | Choi et al. | |
| 2006/0236777 A1 | 10/2006 | Chambers et al. | |
| 2007/0113932 A1 | 5/2007 | Tiliakos et al. | |
| 2008/0128027 A1 | 6/2008 | Hyde et al. | |
| 2008/0128560 A1 * | 6/2008 | Hyde | B64C 23/005 244/203 |
| 2008/0128561 A1 | 6/2008 | Hyde et al. | |
| 2008/0193307 A1 | 8/2008 | Elata et al. | |
| 2008/0245520 A1 | 10/2008 | Hyde et al. | |
| 2009/0173837 A1 | 7/2009 | Silkey et al. | |
| 2010/0123046 A1 | 5/2010 | Khozikov et al. | |
| 2010/0219296 A1 * | 9/2010 | Shelman-Cohen | B63B 1/34 416/223 R |
| 2011/0224846 A1 * | 9/2011 | Simon | F15D 1/12 701/3 |
| 2011/0295102 A1 | 12/2011 | Lakkis et al. | |
| 2012/0193483 A1 | 8/2012 | Essenhigh et al. | |
| 2013/0009016 A1 * | 1/2013 | Fox | B64C 9/24 244/76 R |
| 2015/0191244 A1 | 7/2015 | Rolston | |
| 2015/0257653 A1 | 9/2015 | Hyde et al. | |
| 2016/0089052 A1 | 3/2016 | Cho et al. | |
| 2016/0174842 A1 | 6/2016 | Hyde et al. | |
| 2018/0298762 A1 * | 10/2018 | Shelman-Cohen | F04D 29/681 |
| 2019/0136881 A1 * | 5/2019 | Amitay | B64C 21/08 |
| 2020/0031456 A1 * | 1/2020 | Wine | B62D 35/00 |
| 2020/0148335 A1 | 5/2020 | Wine et al. | |
| 2020/0176664 A1 | 6/2020 | Wine | |
| 2020/0191177 A1 | 6/2020 | Wine et al. | |
| 2020/0217337 A1 | 7/2020 | Loebig | |
| 2021/0348628 A1 | 11/2021 | Holloway et al. | |

FOREIGN PATENT DOCUMENTS

| | | |
|---|---|---|
| FR | 1053332 A | 2/1954 |
| WO | WO-01/76934 A1 | 10/2001 |
| WO | WO-02/103304 A2 | 12/2002 |

(56) References Cited

FOREIGN PATENT DOCUMENTS

| WO | WO-2012/054086 A1 | 4/2012 |
|---|---|---|
| WO | WO-2016/179405 A1 | 11/2016 |
| WO | WO-2016/189448 A2 | 12/2016 |

OTHER PUBLICATIONS

Ainajjar et al., "Receptivity of high-speed jets to excitation using an array of mems-based mechanical actuators", SME Fluids Engineering Division Summer Meeting, Jun. 22-26, 1997, pp. 1-6.
Alfredsson et al., "Large-eddy breakup devices—a 40 years perspective from a Stockholm horizon", Flow Turbulence Combust, 2018, vol. 100, pp. 877-888.
Bird et al., "Compliant kagome lattice structures for generating in-plane waveforms", 2018, vol. 41, No. 142, pp. 86-101.
Bird et al., "Experimental control of turbulent boundary layers with in-plane travelling waves", Flow Turbulence Combust, 2018, vol. 100, pp. 1015-1035.
Bird et al., "In-plane forcing of a turbulent boundary layer, through the actuation of a compliant structure", DRFCM, 2015, pp. 1-2.
Braslow, "A History of suction-type laminar-flow control with emphasis on flight research", 1999, pp. 1-84.
Bushnell, "Chapter VIII : compliant surfaces introduction", Viscous Flow Drag Reduction, 1980, pp. 687-390.
Cattafesta et al., "Actuators for active flow control", Annu. Rev. Fluid Mech., 2001, vol. 43, pp. 247-272.
Chamorro et al., "Drag reduction of large wind turbine blades through riblets: evaluation of riblet geometry and application strategies", Renewable Energy, 2013, vol. 50, pp. 1095-1105.
Corke et al., "Active and passive turbulent boundary layer drag reduction", AIM Journal, 2018, vol. 56, pp. 3835-3847.
Gad-El-Hak et al., "Separation control: review", Journal of Fluids Engineering, 1991, vol. 13, pp. 5-30.
Gad-El-Hak, "Chapter 9: drag reduction using compliant walls", Flow Past Highly Compliant Boundaries and in Collapsible Tubes, Eds. Carpenter and Pedley, Mar. 26-31, 2001, pp. 191-229.
Garcia-Mayoral et al., "Drag rReduction by riblets", Phil Trans. R. Soc A, 2011, vol. 369, pp. 1412-1427.
Gatti et al., "Reynolds-number dependence of turbulent skin-friction drag reduction induced by spanwise forcing", J. Fluid Mech, 2016, vol. 802, pp. 553-582.
Gatti, "Turbulent drag reduction at moderate reynolds number via spanwise velocity waves", PAMM, 2012, 133 pages.
Gouder, "Turbulent friction drag reduction using electroactive polymer surfaces", Doctoral Thesis, Imperial College, May 2011.
Grosjean et al., "Micro balloon actuators for aerodynamic control", IEEE Proceedings MEMS 98, Jan. 25-28, 1998, pp. 1-6.
Hong et al., "Turbulent drag reduction with polymers in rotating disk flow", Polymers, vol. 7, pp. 279-1298.
Huang et al., "MEMS transducers for aerodynamics-a paradym shift", 38th Aerospace Sciences Meeting, 2000, pp. 1-7.
Hurst et al., "The effect of reynolds number on turbulent drag reduction by streamwise travelling waves", J. Fluid Mech., 2014, vol. 759, pp. 28-55.
Jones et al., "Modelling for robust feedback control of fluid flows", Journal of Fluid Mechanics, 2015, vol. 769, pp. 1-34.
Jung et al., "Suppression of turbulence in wall-bounded flows by high-frequency spanwise oscillations", Phys_ Fluids A, 1992, vol. 4, No. 8, pp. 1605-1607.
Kang et al., "Active wall motions for skin-friction drag reduction", Physics of Fluids, 2000, vol. 12, No. 12, pp. 3301-3304.
Karniadakis et al., "Mechanism on transverse motions in turbulent wall flows", Annu. Rev. Fluid Mech., 2003, vol. 35, pp. 45-62.
Kasagi et al., "Toward cost-effective control of wall turbulence of skin friction drag reduction", Advances in Turbulence XII, 2009, pp. 189-200.
Kline et al., "The structure of turbulent boundary layers", Journal of Fluid Mechanics, 1967, vol. 30, pp. 741-773.
Laadhari et al., "Turbulence reduction in a boundary layer by a local spanwise oscillating surface", Physics of Fluids, 1994, vol. 6, pp. 3218-3220.
Lee et al., "Control of roll moment by MEMS". American Society of Mechanical Engineers, 1996, pp. 1797-1803.
Leschziner, "Friction-drag reduction by transverse wall motion—a review", J. of Mechanics, DOI: 10.1017/ mech.2020_31, 15 pages.
Luhar et al., "A framework for studying the effect of compliant surface on wall turbulence", J. Fluid Mech., 2015, vol. 768, pp. 415-441.
Mahfoze et al., "Skin-friction drag reduction in a channel flow with streamwise-aligned plasma actuators," Intl J. of Heat and Fluid Flow, Butterworth Scientific LTD., Guildford, GB, 2017, vol. 66, pp. 83-94.
Marusic et al., "Predictive model for wall-bounded turbulent flow", Science, 2010, vol. 329, No. 5988, pp. 193-196.
Mathis et al., "Estimating wall-shear-stress fluctuations given an outer region input", Journal of Fluid Mechanics, 2013, vol. 715, pp. 163-180.
Melton et al., "Active flow control via discrete sweeping and steady jets on a simple-hinged flap", Aug. 2018, IM Journal, vol. 56, No. 8, pp. 2961-2973.
Morrison, "Mems devices for active drag reduction in aerospace applications", Electronic and Optical Materials, 2014, pp. 153-176.
Naguib et al., "Arrays of MEMS-based actuators for control of supersonic jet screech", AIM, Jun. 29-Jul. 2, 1997, pp. 1-9.
Panton, "Overview of the self-sustaining mechanisms of wall turbulence", Prog. Aerosp. Sci., 2001, vol. 37, pp. 41-383.
Quadrio et al., "Streamwise-traveling waves of spanwise wall velocity for turbulent drag reduction", 2009, vol. 627, pp. 161-178.
Quadrio, "The laminar generalized stokes layer and turbulent drag reduction", J. Fluid. Mech., 2011, vol. 667, pp. 135-157.
Ricco, "Active and passive turbulent drag reduction", Workshop on Turbulent Skin Friction Drag Reduction, Imperial College London, Dec. 4-5, 2017, pp. 1-60.
Sareen et al., "Drag reduction using riblet film applied to airfoils for wind turbines", 49th Aerospaces Sciences Meeting, Jan. 4-7, 2011, pp. 1-19.
Schoppa et al., "A large-scale control strategy for drag reduction in turbulent boundary layers", Physics of Fluids , 1998, vol. 10, No. 5, pp. 1049-1051.
Schroder, "Drag reduction via transversal wave motions", Institute of Aerodynamics, 2017, pp. 1-22.
Shen, "Turbulent flow over a flexible wall undergoing a streamwise travelling wave motion", J. Fluid Mech., 2003, vol. 484, pp. 197-221.
Smith et al., "The characteristics of low-speed streaks in the near-wall region of a turbulent boundary layer", Journal of Fluid Mechanics, 1983, vol. 129, pp. 27-54.
Smits et al., "High reynolds number wall turbulence", Annu. Rev. Fluid Mech., 2011, vol. 43, pp. 353-375.
Symeonidis et al., "Drag reduction in wall-bound turbulence via a transverse travelling wave", J. Fluid Mech., 2002, vol. 457, pp. 1-34.
Tamano, "Turbulent drag reduction due to spanwise traveling waves with wall deformation", Nov. 20, 2014, OR 1779 Symposium, pp. 1-51.
Thomas et al., "Turbulent drag reduction using pulsed-DC plasma actuation", J. of Physics D: Appl. Phys., 2019, vol. 52, No. 34001, 13 pages.
Tomiyama et al., "Direct numerical simulation of drag reduction in a turbulent channel flow using spanwise traveling wave-like wall deformation", Physics of Fluids, 2013, vol. 25, pp. 1-22.
Tsao, "An integrated mems system for turbulent boundary layer control", IEEE Solid State Sensors and Actuators, 1997, pp. 1-4.
Tsao, "Micromachined magnetic actuators for active fluid control", International Mechanical Engineering Congress and Exposition, 1994, pp. 31-38.
Van Buren et al., "Piezoelectric driven oscillating surface (PDOS)", RPI, 2014, 6 pages.
Viotti et al., "Streamwise oscillation of spanwise velocity at the wall of a channel for turbulent drag reduction", Physics of Fluids, 2009, vol. 21, pp. 1-9.

(56) References Cited

OTHER PUBLICATIONS

Wang, "Flow over a surface with parallel grooves", May 2003, vol. 15, No. 5, pp. 1114-1121.
Yang et al., "Micro bellow actuators", IEEE International Solid State Sensors and Actuators Conference, 1997, pp. 1-4.
Zhao et al., "Turbulent drag reduction by traveling wave of flexible wall", Fluid Dynamics Research, 2004, vol. 34, pp. 175-198.
Zhong et al., "Reduction of pressure losses in a linear cascade using herringbone riblets", School of Mechanical, Aerospace and Civil Engineering, University of Manchester, Aug. 17, 2017, 16 pages.

* cited by examiner

SYSTEMS AND METHODS FOR ACTIVE CONTROL OF SURFACE DRAG USING WALL COUPLING

CROSS-REFERENCE TO RELATED APPLICATIONS

The present disclosure claims the benefit of and priority to U.S. Provisional Application No. 62/756,456, titled "SYSTEMS AND METHODS FOR ACTIVE CONTROL OF SURFACE DRAG USING WALL COUPLING," filed Nov. 6, 2018, the entire disclosure of which is incorporated herein by reference for all purposes.

BACKGROUND

The present disclosure relates generally to the field of fluid flow over surfaces. More particularly, the present disclosure relates to systems and methods for active control of surface drag.

Surface drag is a force that acts opposite to the relative motion of an object moving through a fluid. Various material bodies in contact with a moving fluid, including but not limited to air, water, and ground transportation platforms, rotating or translating blades moving through air or water, and fluids transported through pipes and channels, experience some measure of surface drag, which can lead to slower speeds and less fuel efficiency.

SUMMARY

One embodiment relates to a fluid control system that includes a deformable surface that covers a body in at least a first and second direction. The first direction is orthogonal to the second direction. The deformable surface includes a bottom side that faces the body and a top side that is opposite the bottom side. The fluid control system also includes at least one deformer between the deformable surface and the body. The at least one deformer is configured to modify a boundary layer of a fluid that is flowing over the deformable surface by selectively deforming the top side of the surface.

Another embodiment relates to a method that includes using a sensor to measure a parameter of a fluid flowing over a surface. A control signal is generated by a control circuit to modify the parameter, and this control signal is transmitted by the control circuit to at least one deformer. The at least one deformer then selectively deforms the top side of the surface to modify the parameter of the fluid.

Another embodiment relates to a fluid control system that includes a surface that covers a body in at least a first and second direction. The first direction is orthogonal to the second direction. The surface includes a bottom side that faces the body and a top side that is opposite the bottoms side. The fluid control system also includes at least one separate movable section on the top side of the surface. The at least one separate movable section is configured to modify a boundary layer of a fluid flowing over the surface by moving along the top side of the surface.

Another embodiment relates to a method that includes using a sensor to measure a parameter of a fluid flowing over a surface. A control signal is generated by a control circuit to modify the parameter, and this control signal is transmitted by the control circuit to at least one separate movable section on the top side of the surface. The at least one separate movable section then is moved to modify the parameter of the fluid.

Another embodiment relates to a system. The system includes a surface having a fluid flowing over the surface, the fluid including a first turbulent flow regime within a first distance of the surface and a second turbulent flow regime at least a second distance from the surface, the second distance greater than the first distance, an actuator coupled to the surface to move the surface relative to the fluid, and a controller that causes the actuator to cause the surface to move with a movement parameter corresponding to a flow parameter of at least one of the first turbulent flow regime or the second turbulent flow regime.

Another embodiment relates to a method. The method includes coupling an actuator to a surface having a fluid flowing over the surface, the fluid including a first turbulent flow regime within a first distance of the surface and a second turbulent flow regime at least a second distance from the wall, the second distance greater than the first distance, and causing, by a controller, the actuator to cause the surface to move relative to the fluid with a movement parameter corresponding to a flow parameter of at least one of the first turbulent flow regime or the second turbulent flow regime.

Another embodiment relates to a method. The method includes identifying a streamwise length scale of at least one flow regime of a fluid flowing over a surface. The method includes identifying a convective time scale of the at least one flow regime. The method includes causing at least one of (1) motion of at least a portion of the surface to modify fluid flow in the at least one flow regime of the fluid based on the streamwise length scale and the convective time scale or (2) motion of the at least one flow regime based on the streamwise length scale and the convective time scale.

Another embodiment relates to a system. The system includes a surface having a fluid flowing over the surface, the fluid including at least one flow regime having a streamwise length scale and a convective time scale. The system includes a controller that causes at least one of (1) motion of at least a portion of the surface to modify fluid flow in the at least one flow regime of the fluid based on the streamwise length scale and the convective time scale or (2) motion of the at least one flow regime based on the streamwise length scale and the convective time scale.

Another embodiment relates to a method. The method includes identifying a streamwise length scale of at least one flow regime of a fluid flowing over a surface. The method includes causing at least one of (1) motion of at least a portion of the surface to modify fluid flow in the at least one flow regime of the fluid based on the streamwise length scale or (2) motion of the at least one flow regime based on the streamwise length scale.

Another embodiment relates to a system. The system includes a surface having a fluid flowing over the surface, the fluid including at least one flow regime having a streamwise length scale. The system includes a controller that causes at least one of (1) motion of at least a portion of the surface to modify fluid flow in the at least one flow regime of the fluid based on the streamwise length scale or (2) motion of the at least one flow regime based on the streamwise length scale.

Another embodiment relates to a method. The method includes identifying a streamwise length scale of at least one flow regime of a fluid flowing over a surface. The method includes providing one or more structures of the surface, the one or more structures having a structure length scale corresponding to the streamwise length scale.

Another embodiment relates to a system. The system includes a surface having a fluid flowing over the surface, the fluid including at least one flow regime having a streamwise length scale. The system includes one or more structures coupled with the surface, the one or more structures having a structure length scale corresponding to the streamwise length scale.

Another embodiment relates to a method. The method includes identifying a convective time scale of at least one flow regime of a fluid flowing over a surface. The method includes causing at least one of (1) motion of at least a portion of the surface to modify fluid flow in the at least one flow regime of the fluid based on the convective time scale or (2) motion of the at least one flow regime based on the convective time scale.

Another embodiment relates to a system. The system includes a surface having a fluid flowing over the surface, the fluid including at least one flow regime having a convective time scale. The system includes a controller that causes at least one of (1) motion of at least a portion of the surface to modify fluid flow in the at least one flow regime of the fluid based on the convective time scale or (2) motion of the at least one flow regime based on the convective time scale.

Another embodiment relates to a method. The method includes identifying a convective time scale of at least one flow regime of a fluid flowing over a surface. The method includes providing one or more structures of the surface, the one or more structures having a structure length scale corresponding to the convective time scale.

Another embodiment relates to a system. The system includes a surface having a fluid flowing over the surface, the fluid including at least one flow regime having a convective time scale. The system includes one or more structures coupled with the surface, the one or more structures having a structure length scale corresponding to the convective time scale.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

DETAILED DESCRIPTION

Figure 1:
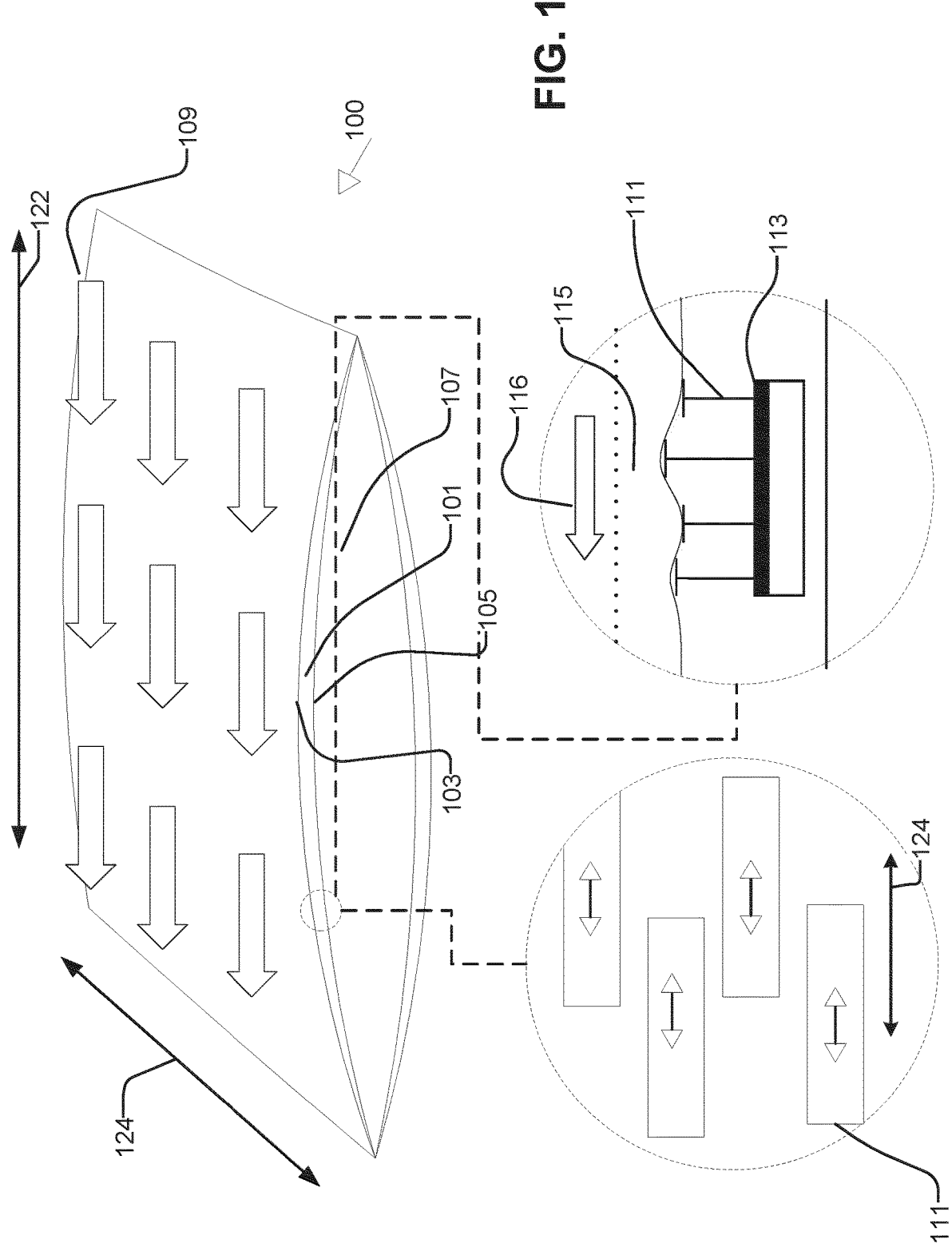
FIG. 1 is a schematic diagram of a fluid control system using a deformable surface according to an embodiment of the present disclosure.

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, systems and methods described herein can be used to actively control drag on surfaces. Drag is a force acting opposite to the relative motion of any object moving with respect to a surrounding fluid. Drag manipulation technology has a wide range of applications for improving performance of systems that involve fluid flowing over a surface. For example, efficiency and speed can be increased in all manners of objects and fluids moving relative to one another, including turbines, fan blades, propellers, pipe flow, air transportation, including commercial aircraft, military aircraft, rockets, unmanned aerial vehicles, and general aviation. Reducing drag also increases efficiency in ground transportation such as in trains, cars, and tractor trailers. Water transportation, including maritime shipping, personal boating, and undersea transportation can similarly be benefited by reducing drag. Reducing drag can also boost efficiency when transporting fluids through pipes such as in natural gas or oil pipelines. Manipulating drag can be valuable across a wide range of Reynolds numbers, including relatively high Reynolds numbers experienced by maritime shipping through water and the relatively low Reynolds numbers experienced by unmanned aerial vehicles. Selectively increasing drag can also be useful for braking, steering, and other control of platforms, such as wind turbines and marine propellers. Being able to actively control surface drag of an object allows for not only the minimization of surface drag when efficiency or speed is most needed, but it can also allow for better steering and braking capabilities through selectively increasing surface drag.

Various fluids, including air, can act as a viscous fluid. Using air as an example of a fluid, an object (such as the platforms mentioned above) moving through air may collect a group of air particles, which the object tends to pulls along as the object moves. Air particles close to the surface of the object tend to move with approximately the same velocity as the object due to molecular attraction. As a flat plate, airfoil, or other object moves through a free stream of air at a given relative velocity, viscous adhesion causes a boundary layer of air having velocities lower than of the free stream velocity to form adjacent to the object surface. The boundary layer can be a layer of air surrounding an object in which the relative velocity of the layer of molecules closest to the object is at or near zero, and in which the relative velocity at successively distant points from the object changes, generally increasing with distance until it approaches that of the free stream (e.g., the increase may not be monotonic), at which point the outer limit of the boundary layer is reached. For example, for an airfoil, the boundary layer can include the interface between the airfoil and the air mass surrounding the airfoil. The boundary layer may be relatively small as compared to a size dimension of the object.

The gradient of velocity near the wall (e.g., near the surface), affects the viscous drag. For example, as the velocity gradient increases (decreases) the viscous drag can increase (decrease). Disturbances such as turbulent fluctuations in velocity can affect the velocity gradients near the wall, such as to increase the velocity gradients and in turn increase drag. As Reynolds number increases, turbulent flow is more likely to be present, and thus at higher Reynolds numbers turbulent motions can have increased contributions to drag.

Drag may also be caused by small disturbances in flow, retarding flow near a surface. Examples of such disturbances include but are not limited to Tollmein-Schlichting waves. These small disturbances may not naturally dissipate as Reynolds number increases, which can lead to interactions that cause the disturbances to grow, leading to the development of turbulent motions and eddies that can span a wide range of length and time scales. Disturbances may grow and develop away from the surface into the outer boundary layer, which can cause continued disturbances. The present solution can control surface drag by controlling the difference between the velocity of the free stream and the relative velocities of different sections of the boundary layer, by interrupting the generation of disturbances near the surface and/or the downstream growth of these disturbances. Specifically, the present solution can control the formation and growth of the near-wall streaks, which are disturbances of lengths (e.g., streamwise length scales) of $10\eta$ to $100000\eta$ (or, in some embodiments $100\eta$ to $10000\eta$), where $\eta$ is the viscous length scale equal to the kinematic viscosity $\nu$ divided by the square root of the wall shear stress $\tau_w$ divided by the fluid density $\rho$ (see Equation 1 below), and which are disturbances with time scales (e.g., convective time scales) of duration $10\eta'$ to $10000\eta'$, where $\eta'$ is the viscous time scale equal to the kinematic viscosity $\nu$ divided by the wall shear stress $\tau_w$ divided by the fluid density $\rho$ (see Equation 2 below). The turbulent eddies can have a size (e.g., length) of $10\eta$ to $100000\eta$.

$$\eta = \frac{\nu}{\sqrt{\frac{\tau_w}{\rho}}} \qquad \text{(Equation 1)}$$

$$\eta' = \frac{\nu}{\frac{\tau_w}{\rho}} \qquad \text{(Equation 2)}$$

Turbulent flow in boundary layers can contribute towards drag. A turbulent boundary layer can have a large number of eddies that transfer momentum from the faster moving outer portions of the boundary layer to the relatively slower portions closer to the surface. As such, turbulent boundary layers may have more surface friction than laminar boundary layers, which have more smooth flows, and are generally free from these eddies. Making the boundary layer less turbulent can be used to decrease drag, and conversely making the boundary layer more turbulent can be used to increase drag. The present solution can control surface drag by controlling the turbulence level of a boundary layer Systems and methods of the present solution can manipulate the boundary layer by creating deformations in the surface covering the body. This creates movement on the surface that is perpendicular to the flow of the fluid (e.g., spanwise motion). Systems and methods of the present solution can move separate sections of the surface in a direction parallel to the flow of the fluid (e.g., streamwise motion). Both spanwise and streamwise motion can agitate the air molecules very close to the wall, and so change the velocity gradient at the wall and reduce or enhance drag.

In some embodiments, systems and methods of the present solution can manipulate turbulent motions having specific flow parameters. For example, surface motions can be performed to target turbulent motions having length scales (e.g., streamwise length scales) in the range of $100\eta$ to $10,000\eta$ (see Equation 1 above), and which can have time scales (e.g., convective time scales) in the range of $10\eta'$ to $1000\eta'$ (see Equation 2 above). Causing motions of the surface on such length and time scales can enable effective control over turbulent motions of the fluid, such as to increase or decrease surface drag depending on how the motions are performed. The surface can include or be coupled with various structures described herein (e.g., deformers, actuators, ridges, channels, extensions, protuberances) having structure length scales (including distances between the structures) corresponding to the streamwise length scales, the streamwise time scales, or a combination thereof, enabling effective modification of the surface drag for the targeted turbulent motions. The structure length scales can correspond to the streamwise length scales by being selected to being within an order of magnitude of the streamwise length scales or streamwise time scales, within a factor of five of the streamwise length scales or streamwise time scales, within a factor of three of the streamwise length scales or streamwise time scales, within a factor of two of the streamwise length scales or streamwise time scales, or within a factor of 1.5 of the streamwise length scales or streamwise time scales.

Both spanwise and streamwise motion, or some combination of the two, can create one or more surface waves (mechanical waves that propagate along the interface between the deformable surface and the fluid) that can manipulate the boundary layer in one or more directions. The surface waves can be simple surface waves such as sinusoidal waves or may be any other type of waves, including but not limited to superposition of sinusoids. Further, the waveform of the surface waves may be aperiodic or damped, or may comprise numerous surface displacements or deformations. Any of a variety of signal processing and analysis techniques may be applied in order to generate the desired waveforms, including but not limited to Fourier transforms, fast Fourier transforms (FFTs), wavelet transforms, and the like.

As compared to existing systems, which may rely on providing an aerodynamic shape of a body rather than manipulating the boundary layer of a fluid and may not allow for real-time control of surface manipulation to control surface drag, the present solution can actively create deformations on a surface surrounding a body and/or actively move separate sections of a surface surrounding a body. As such, the present solution can enable more adaptable and controllable boundary layer manipulation, surface wave generation, and surface drag modification.

Although many of the concepts disclosed herein may be described with reference to air as being the fluid medium, the present solution can enable active control of surface drag of any of a variety of fluids.

A. Systems and Methods for Active Control of Surface Drag using Surface Deformation Referring generally to FIGS. 1-8, a fluid control system is shown that can be used to actively control surface drag of a surface by deforming the surface. For example, the fluid control system can cause the surface to move in a direction perpendicular to an initial plane at which the surface (or a portion thereof) is located. In some embodiments, the fluid control system includes a deformable surface that covers a body in at least a first and second direction. The first direction is orthogonal to the second direction. The deformable surface includes a bottom side that faces the body and a top side that is opposite the bottom side. The fluid control system also includes at least one deformer between the deformable surface and the body. The at least one deformer is configured to modify a boundary layer of a fluid that is flowing over the deformable surface by selectively deforming the top side of the surface. The fluid control system can selectively control surface drag over the deformable surface by selectively deforming the top side of the surface.

Figure 2:
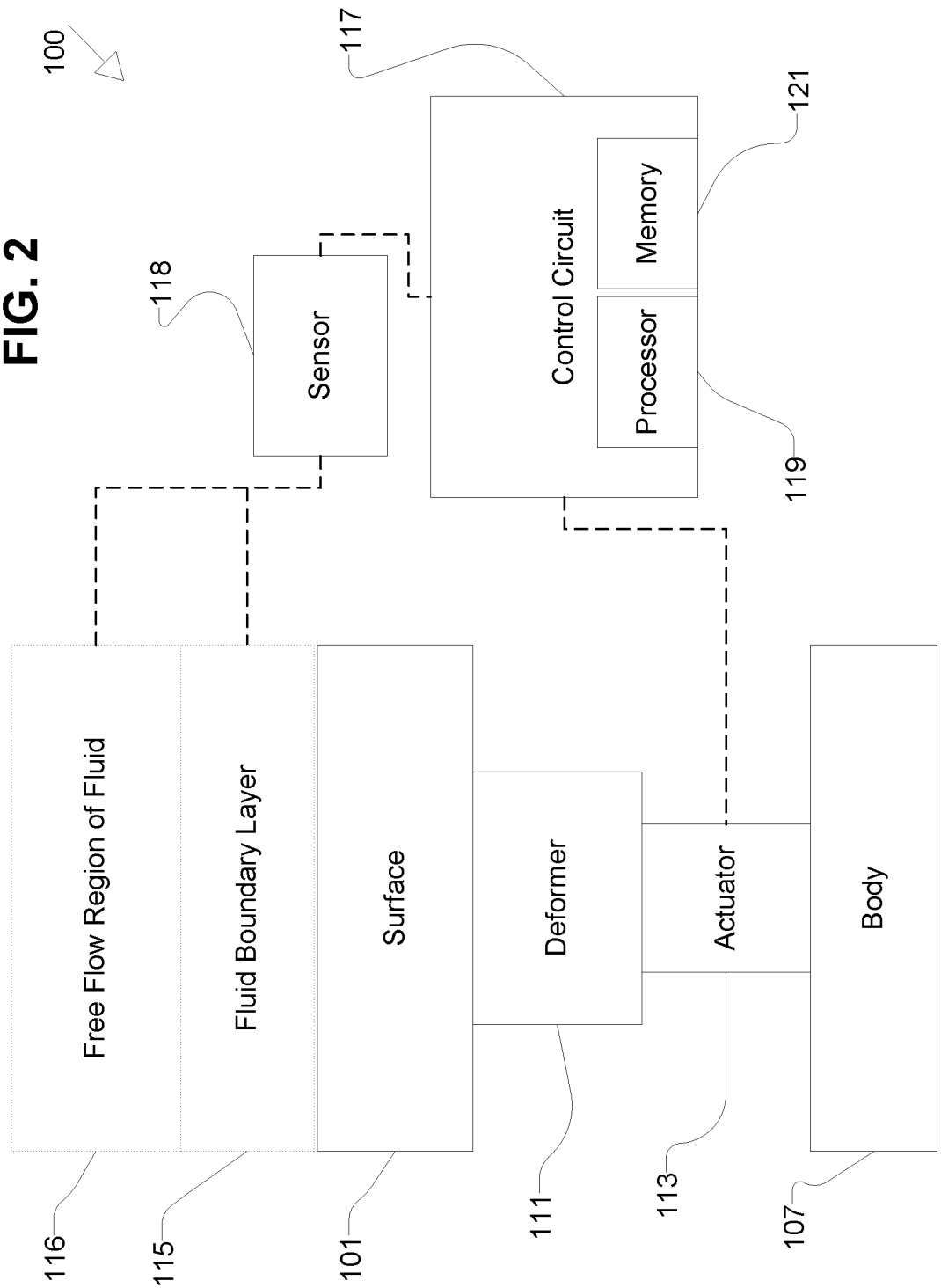
FIG. 2 is a block diagram of a fluid control system using a deformable surface according to an embodiment of the present disclosure.

Referring now to FIGS. 1-2, a fluid control system 100 using a deformable surface 101 is depicted. The deformable surface 101 covers a body 107 in a first and second direction. The deformable surface 101 has a bottom side 105 that faces the body 107 and a top side 103 that is opposite the bottom side 105. The body 107 can be in the shape of an airfoil.

In some embodiments, the body 107 includes the wing, tail section, fuselage or any other part or combination of parts of a rocket, commercial aircraft, military aircraft, unmanned aerial vehicle, or any other air transportation platform. The body 107 could also be the blade of a wind turbine, gas turbine, or other mechanism. In some embodiments, the body 107 is the outer hull or any other part or combination of parts of a submarine, submersible, boat, ship, barge, personal watercraft, waterski or any other water transportation platform. In some embodiments, the body 107 is the frame or any other part or combination of parts of a of a tractor trailer, truck, tractor trailer, car, motorcycle, tractor, lawnmower, motorized scooter, bicycle or any other ground transportation platform. In some embodiments, the body 107 is of a closed or partially closed component, such as a pipe. The body 107 can be part of a movable or non-movable system.

The fluid control system 100 includes one or more deformers 111 that are configured to deform the top side 103 of the deformable surface 101. By deforming the top side 103 of the deformable surface 101, the deformers 111 can actively control surface drag over the deformable surface 101. The deformers 111 can generate deformations on the surface perpendicular to the flow of a fluid 109. The fluid 109 can be air, water, or any other fluid which may flow over the deformable surface 101. As shown in FIG. 1, the fluid 109 flows in a streamwise direction 122 perpendicular to a spanwise direction 124. By moving the deformable surface 101 into and out of an initial plane in which the deformable surface 101 (or a portion thereof) was located, the deformers 111 can change the velocity of the fluid 109 at a boundary layer 115. The deformations can also be performed in-plane, causing a back-and-forth motion of the surface (e.g., relative to streamwise direction 122 or spanwise direction 124 as depicted in FIG. 1), substantially in-plane. This motion can also change the velocity of the fluid.

The deformers 111 can selectively deform the top side 103 of the deformable surface 101, which can modify the boundary layer 115 of the fluid 109 that is flowing across the deformable surface 101. The deformers 111 can individually deform the deformable surface at specific locations, allowing for control over the placement of deformations across the top side 103 of the deformable surface 101. In some embodiments, the deformers 111 can control one or more of the frequency, wavelength, amplitude, duration, and intermittency of the deformations on the deformable surface 101 to cause an expected surface wave of the fluid 109 to achieve a desired change in the surface drag of the fluid 109 flowing across the deformable surface 101.

In some embodiments, one or more actuators 113 controls the one or more deformers 111. In some embodiments each actuator 113 controls a corresponding deformer 111. In some embodiments at least one actuator 113 controls more than one deformer 111. The one or more actuators 113 can be powered by an external power source, battery, solar energy, internal combustion engine or any other power source. For example, the control circuit 117 discussed below can output a control signal to cause the power source to deliver a desired current and/or desired voltage to the one or more actuators 113 to cause the one or more actuators 113 to move. The one or more actuators 113 could also be powered from a transducer that converts the flow energy directly into an energy form that the actuators can use (e.g., a piezoelectric transducer that outputs an electrical signal responsive to being driven by the flow).

The deformers 111 can create surface waves to modify turbulence of the boundary layer 115. The fluid 109 in the boundary layer 115 will have a velocity profile with velocities that are less than a velocity in the free flow region 116 of the fluid 109. The deformers 111 can generate selective deformations at specific locations on the deformable surface 101 and at specific times to generate spanwise motion, which can create one or more surface waves, which can modify the relative velocities of the fluid 109 at the boundary layer 115 and/or the amount of turbulent flow in the boundary layer 115. The controlled modification of the boundary layer 115 by the deformers 111 can allow for a measure of control over the surface drag the body 107 experiences when travelling through the fluid 109.

In some embodiments, the deformable surface 101 includes at least one of an elastomeric material, a thin film material, silicon nitrite, graphite, or a long chain polymer. The material of the deformable surface 101 may be chosen to enhance the aerodynamic properties of the deformable surface 101. The material of the deformable surface 101 may be chosen to achieve a proper interface between the boundary layer 115 and the body 107 that is most conducive to active control of surface drag.

In some embodiments the deformable surface 101 includes a flexible material and is configured to be stretched over bodies of different shapes. This allows for the deformable surface 101 to be manufactured to work with several different bodies. For instance, the deformable surface 101 can be configured to fit onto airplane wings of different models but that all have similar sizes. The deformable surface 101 can be adjusted slightly when placed onto each body 107. The deformers 111 can be located in certain positions with respect to the expected fluid flow direction to enable desired active control of surface drag.

Referring further to FIG. 2, the fluid control system 100 includes a sensor 118. The sensor 118 can detect at least one parameter of the fluid 109 surrounding the deformable surface 101, which is covering the body 107 in a first and second direction. The sensor 118 can include a flow meter to detect a velocity of fluid 109 of the fluid boundary layer 115. The sensor 118 can include a flow meter detect a velocity of the fluid 109 of the free flow region 116.

In some embodiments, the sensor 118 detects a parameter associated with the body 107, or a platform that includes the body 107. For example, the sensor 118 can include a position sensor that detects at least one of a position or an orientation of the body 107, such as an accelerometer, a gyroscope, a GPS/GNSS sensor, or an inertial navigation system. The sensor 118 can include a pressure sensor. The sensor 118 can include a temperature sensor. In some embodiments, the sensor 118 detects a parameter associated with a fuel level of a platform that includes the body 107, which can be used (by control circuit 117 described below) to determine a fuel burn rate of the platform.

The fluid control system 100 includes a control circuit 117, in some embodiments. The control circuit can include a processor 119 and memory 121. The processor 119 can be a general purpose or specific purpose processor, an application specific integrated circuit (ASIC), one or more field programmable gate arrays (FPGAs), a group of processing components, or other suitable processing components. The processor 119 is configured to execute computer code or instructions stored in memory 121 or received from other computer readable media (e.g., CDROM, network storage, a remote server, etc.). Memory 121 can include one or more devices (e.g., memory units, memory devices, storage devices, etc.) for storing data and/or computer code for completing and/or facilitating the various processes described in the present disclosure. Memory 121 can include random access memory (RAM), read-only memory (ROM), hard drive storage, temporary storage, non-volatile memory, flash memory, optical memory, or any other suitable memory for storing software objects and/or computer instructions. Memory 121 can include database components, object code components, script components, or any other type of information structure for supporting the various activities and information structures described in the present disclosure. Memory 121 can be communicably connected to processor 119 via control circuit 117 and may include computer code for executing (e.g., by processor 119) one or more processes described herein. When processor 119 executes instructions stored in memory 121, processor 119 generally configures the control circuit 117 to complete such activities.

The sensor 118 sends detected parameters to the control circuit 117. The control circuit 117 generates a control signal based on the parameter(s) received from the sensor 118. The control circuit 117 may generate the control signal by implementing any of a variety or combination of applicable control algorithms, including but not limited to intelligent algorithms (artificial intelligence, fuzzy control, neural networks, genetic algorithms, stochastic optimization based control, etc.), lookup tables, traditional controllers (classical controllers, multivariable controllers, optimal controllers, etc.), etc. The control circuit 117 can calculate a surface drag of the fluid 109 flowing over the deformable surface 101 based on the received parameters, such as based on velocity and/or pressure information.

The control circuit transmits the control signal to the actuator 113, which moves the deformers 111 to create a deformation in the deformable surface 101. This deformation can modify the fluid boundary layer 115, which can result in a modification of the surface drag on the body 107.

In some embodiments, the control circuit 117 generates the control signal by determining a desired characteristic of a surface wave to be generated by operation of the deformers 111, and executes a control function that translates the desired characteristic into information to control operation of the actuator(s) 113. For example, the control circuit 117 can generate the control signal to indicate at least one of an amplitude, frequency, or intermittency of motion of each of the deformers 111 based on the desired characteristic of the surface wave. The control circuit 117 can similarly generate the control signal based on a desired surface drag of the fluid 109, velocity of the fluid 109, flow rate of the fluid 109, or other parameter associated with the body 107, deformable surface 101, and/or fluid 109. The characteristic of the surface wave can include a spatial amplitude, temporal amplitude (e.g., length of time over which the motion occurs), spatial frequency (e.g., frequency that incorporates information regarding magnitude of oscillation), temporal frequency, or any combination thereof.

In some embodiments, the control circuit 117 generates the control signal based on a parameter detected by the sensor 118. For example, the control circuit 117 can receive a parameter such as speed, fuel level, or other parameter associated with operation of a platform that includes the body 107, compare the received parameter to a target value of the parameter, and modify the control signal to reduce a difference between the received parameter and the target value of the parameter. Similarly, the control circuit 117 can generate the control signal to achieve a target value of surface drag, flow rate of fluid 109, or other parameters that may be measured by sensor 118 and/or calculated based on parameters measured by sensor 118.

Figure 3:
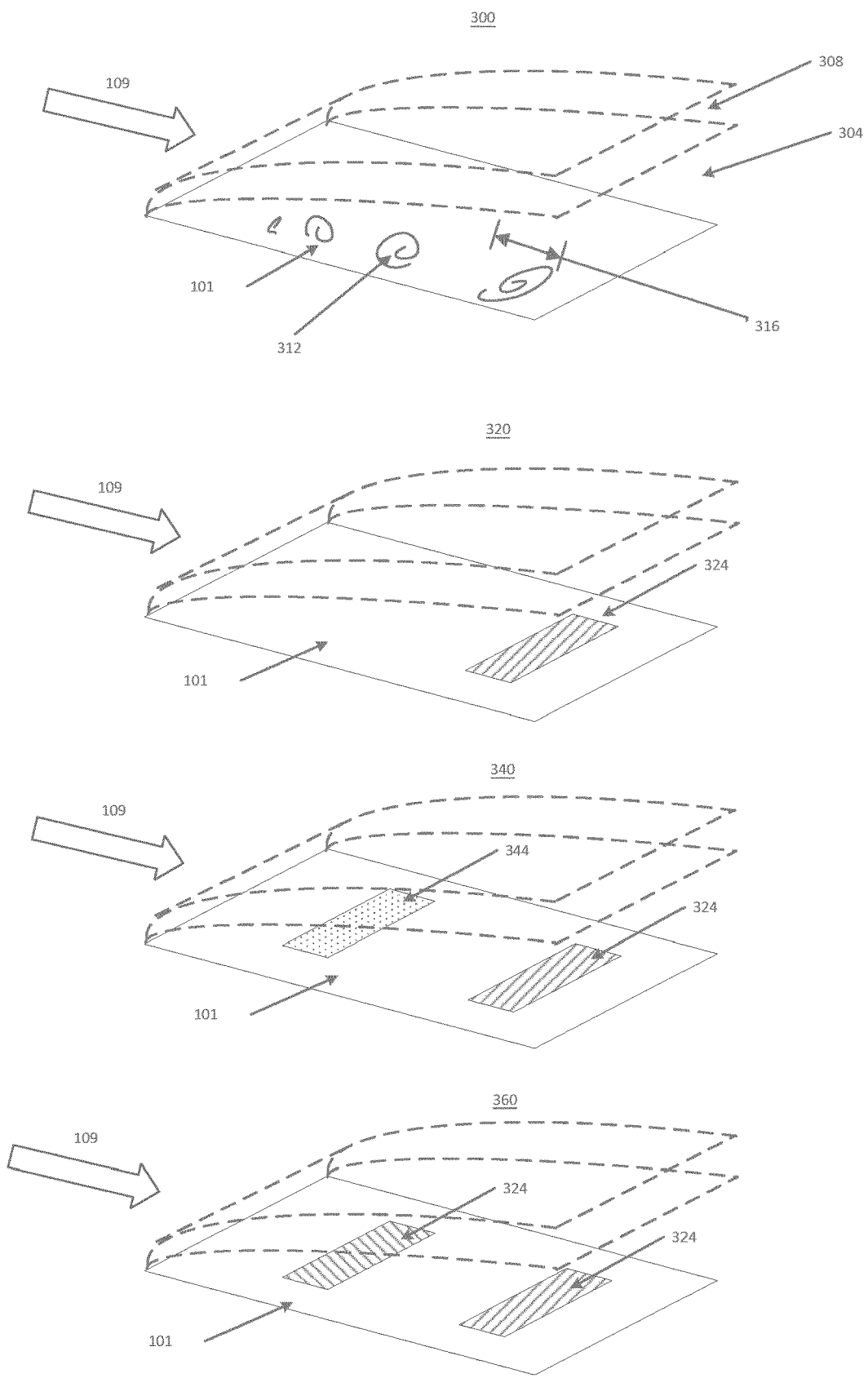
FIG. 3 depicts examples of multiple flow regimes with respect to a surface.

Referring now to FIG. 3, in a system 300, the fluid 109 flows over the surface 101 with multiple flow regimes 304, 308. For example, the fluid 109 can have a first turbulent regime 304 and a second turbulent regime 308 further from the surface 101 than the first turbulent regime 304. The first turbulent regime 304 may be located beyond a boundary layer of the fluid 109 relative to the surface 101. The flow regimes 304, 308 (or portions thereof) may become turbulent beyond a threshold distance from a leading edge of the surface 101 along a streamwise direction of the flow of the fluid 109.

The flow regimes 304, 308 may be characterized by different flow parameters, such as Reynolds number or eddy size. Various aspects of the flow of the fluid 109 and the regimes 304, 308 may be characterized based on turbulent features of the flow. For example, the fluid 109 may include turbulent eddies 312. The turbulent eddies 312 may be characterized by parameters such as a size parameter 316 of the turbulent eddies 312.

In a system 320, the surface 101 may include or be coupled with at least one actuation region 324. The at least one actuation region 324 can correspond to a portion of the surface 101 moved by the deformer 111 or the actuator 113 as described with reference to FIGS. 1-2. For example, the at least one actuation region 324 can be caused to perform in-plane motion or out-of-plane motion to modify fluid flow in the first regime 304, the second regime 308, or a combination thereof.

In a system 340, the surface 101 may include or be coupled with at least one sensor region 344. The at least one sensor region 344 may be used to detect various parameters of the fluid 109. The sensor 118 can be provided at the at least one sensor region 344, such as to detect parameters associated with velocity or flow rate of the fluid 109. The at least one actuation region 324 (e.g., actuators or deformers thereof) can operate using the parameters detected by the at least one sensor region 344.

In a system 360, the surface 101 may include or be coupled with a plurality of actuation regions 324. The actuation regions 324 may be spaced from one another along the surface 101, such as along a streamwise direction relative to the flow of the fluid 109. The actuation regions 324 may have different orientations relative to one another, which can enable the actuation regions 324 to differentially control parameters of the flow of the fluid 109. For example, the actuation regions 324 may be driven to move at different frequencies or oscillation distances.

Figure 4:
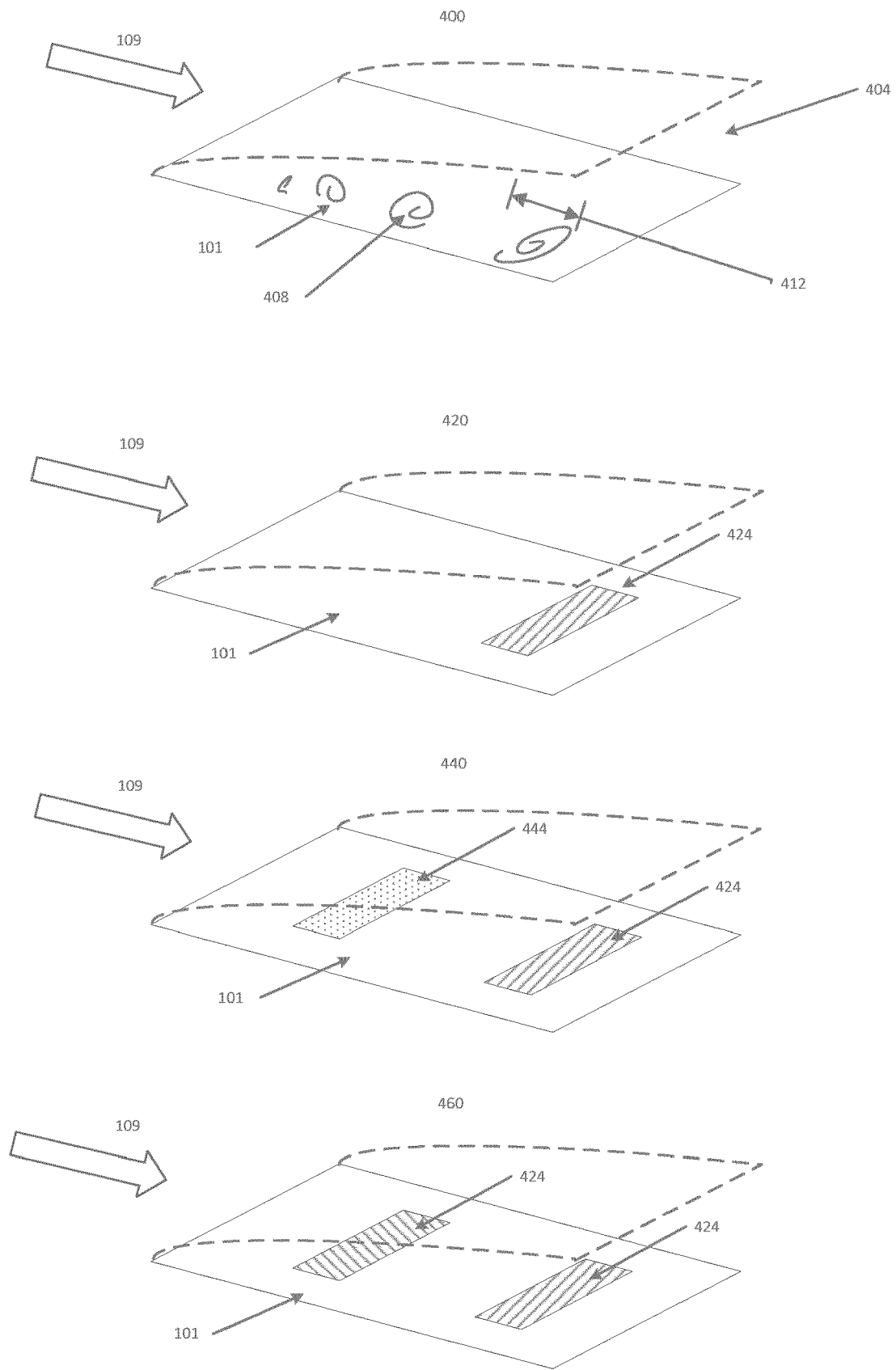
FIG. 4 depicts examples of a single flow regime with respect to a surface.

Referring now to FIG. 4, in a system 400, the fluid 109 flows over the surface 101 with a single flow regime 404. The flow regime 404 may be similar to the flow regimes 304, 308. The flow regime 404 may include turbulent eddies 408, which can be characterized by parameters such as a size parameter 412.

In a system 420, the surface 101 can include or be coupled with at least one actuation region 424. The at least one actuation region 424 can be similar to the at least one actuation region 324, in order to control drag or other characteristics of the flow of the fluid 109 over the surface 101. In a system 440, the surface 101 can include or be coupled with at least one sensor region 444 and at least one actuator region 424. The at least one actuator region 424 can operate based on parameters of the flow of the fluid 109 detected via the at least one sensor region 444. In a system 460, the surface 101 can include or be coupled with multiple actuation regions 424, which may operate in different manners to differentially control various parameters of the fluid 109.

Figure 5:
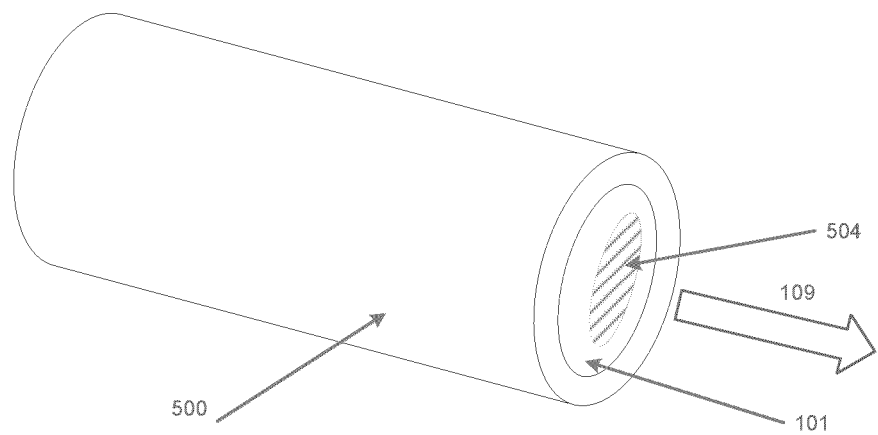
FIG. 5 depicts an example of an actuator associated with fluid flow through a pipe.

Referring now to FIG. 5, the surface 101 can be formed by a body that at least partially surrounds the fluid 109, such as a pipe 500 through which the fluid 109 flows. The surface 101 can form an inner surface of the pipe 500 facing towards the fluid 109.

The pipe 500 can include or be coupled with at least one actuator 504. The actuator 504 can be similar to the actuator 113, such as to cause in-plane or out of plane movement of at least a portion of the surface 101. The actuator 504 can be coupled with a film portion of the surface 101 to move the film portion. The actuator 504 can operate based on sensor data received from one or more sensors (e.g., sensors 118). The actuator 504 can be used to move the surface 101 to adjust surface drag on the surface 101 to adjust a flowrate of the fluid 109.

Figure 6:
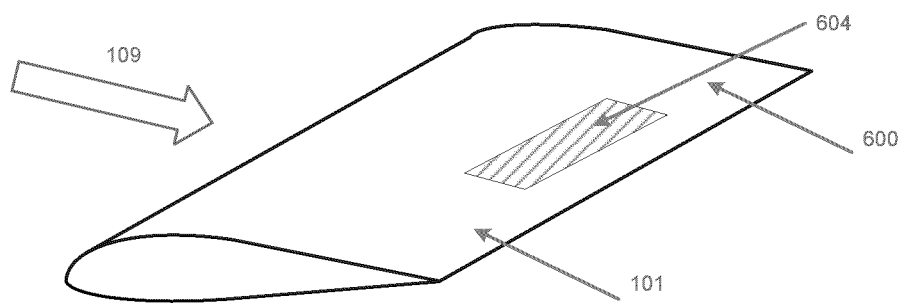
FIG. 6 depicts an example of an actuator associated with fluid flow over a stationary or movable platform.

Referring now to FIG. 6, the surface 101 can form at least a portion of a surface of a movable or stationary body 600, such as a wing of an aircraft. The fluid 109 can flow over the body 600. The body 600 can include or be coupled with at least one actuator 604, which can be similar to the actuator 113, such as to cause in-plane or out of plane movement of at least a portion of the surface 101. The actuator 604 can be coupled with a film portion of the surface 101 to move the film portion. The actuator 604 can operate based on sensor data received from one or more sensors (e.g., sensors 118). The actuator 604 can be used to move the surface 101 to adjust surface drag on the surface 101 to adjust a velocity of the body 600 as the body 600 moves through the fluid 109.

Figure 7:
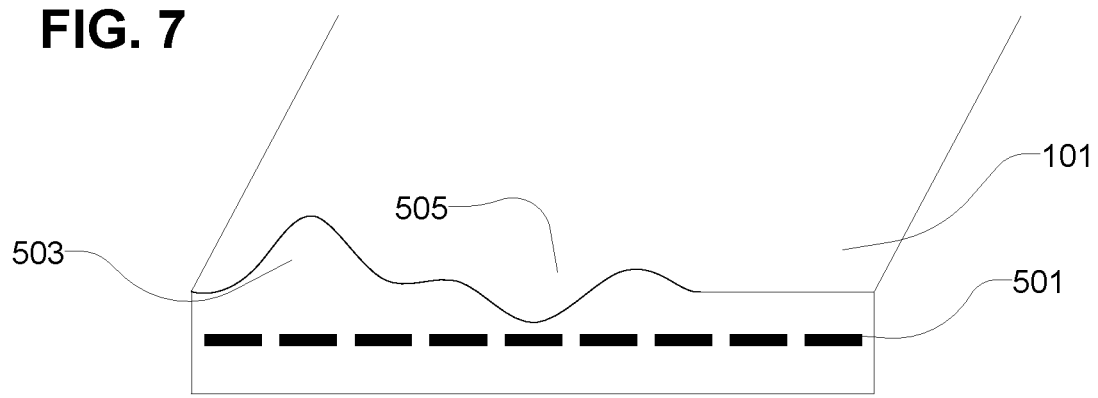
FIG. 7 is a schematic diagram of a fluid control system using a deformable surface and electromagnetic deformers according to an embodiment of the present disclosure.
Figure 8:
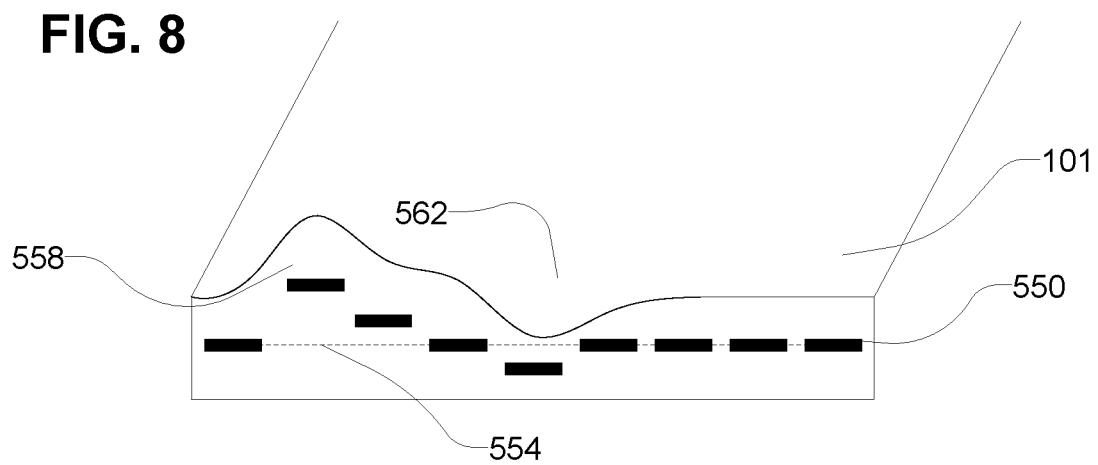
FIG. 8 is a schematic diagram of a fluid control system using a deformable surface and piezoelectric deformers according to an embodiment of the present disclosure.

Referring now to FIG. 7, at least one actuator 113 includes one or more electromagnetic deformers 501, in some embodiments. The one or more electromagnetic deformers 501 can selectively generate one or more electromagnetic impulses (e.g., time-varying electromagnetic fields) at controlled locations. In various such embodiments, the deformable surface 101 responds to electromagnetic impulses and can either be attracted to the electromagnetic impulses, as a region 505, or repelled by the electromagnetic impulses, as at region 503. The reaction by the deformable surface 101 to the electromagnetic impulses created by the electromagnetic deformer 501 creates deformations on the deformable surface 101. The electromagnetic deformers 501 can modulate at least one of a frequency or a magnitude of the electromagnetic impulses to selectively move the deformable surface 101. Referring now to FIG. 8, at least one actuator 113 includes one or more piezoelectric deformers 550. The one or more piezoelectric deformers 550 can selectively oscillate (e.g., relative to a baseline 554) to cause movement of the surface 101. For example, the one or more piezoelectric deformers 550 can selectively oscillate to cause out of plane motions 558 above the baseline 554 (e.g., into fluid adjacent to the surface 101) or below the baseline 554 (e.g., away from fluid adjacent to the surface 101). The one or more piezoelectric deformers 550 can be oriented to selectively oscillate to cause in-plane movement of the surface 101, such as by being oriented with an oscillation axis parallel to the surface 101. The one or more piezoelectric deformers 550 may be positioned with differing baselines 554. The one or more piezoelectric deformers 550 may be caused to oscillate responsive to being driven by a control signal. The control signal may have a current or voltage indicative of at least one of an amplitude, frequency, or intermittency of oscillation of the one or more piezoelectric deformers 550. For example, the one or more piezoelectric deformers 550 may be driven by a pulse width modulated control signal.

Figure 9:
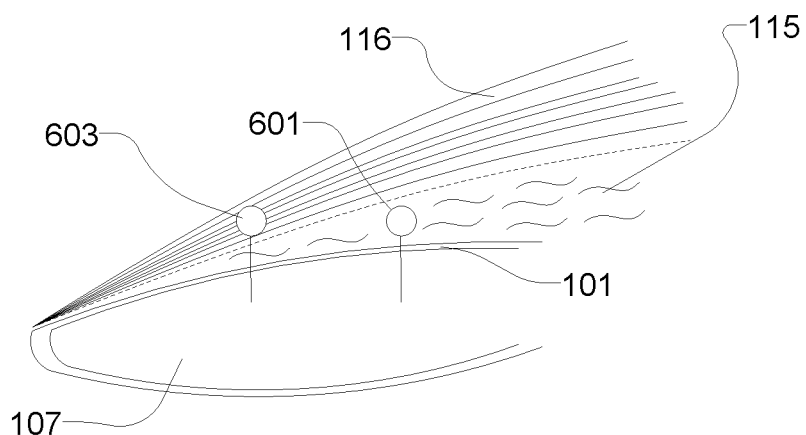
FIG. 9 is a schematic diagram of sensors used in a fluid control system according to an embodiment of the present disclosure.

Referring now to FIG. 9, the deformable surface 101 is depicted covering the body 107. In some embodiments, at least one sensor 603 measures parameters of the free flow region 116 of the fluid 109. At least one sensor 601 measures parameters of the boundary layer region 115 of the fluid 109 (not shown). The parameters measured by the sensors 603 and 601 may include the fluid flow velocity, the temperature, the fluid pressure and the viscosity of the fluid. In some embodiments, either or both of the sensors 601 and 603 transmit their measurements to a control circuit 117 as depicted in FIG. 2. The control circuit 117 can use these measurements to calculate parameters associated with surface deformations that result in a modification to the boundary layer of fluid surrounding the deformable surface 101, to enable the control circuit 117 to output control signals based on desired modification to the boundary layer.

Figure 10:
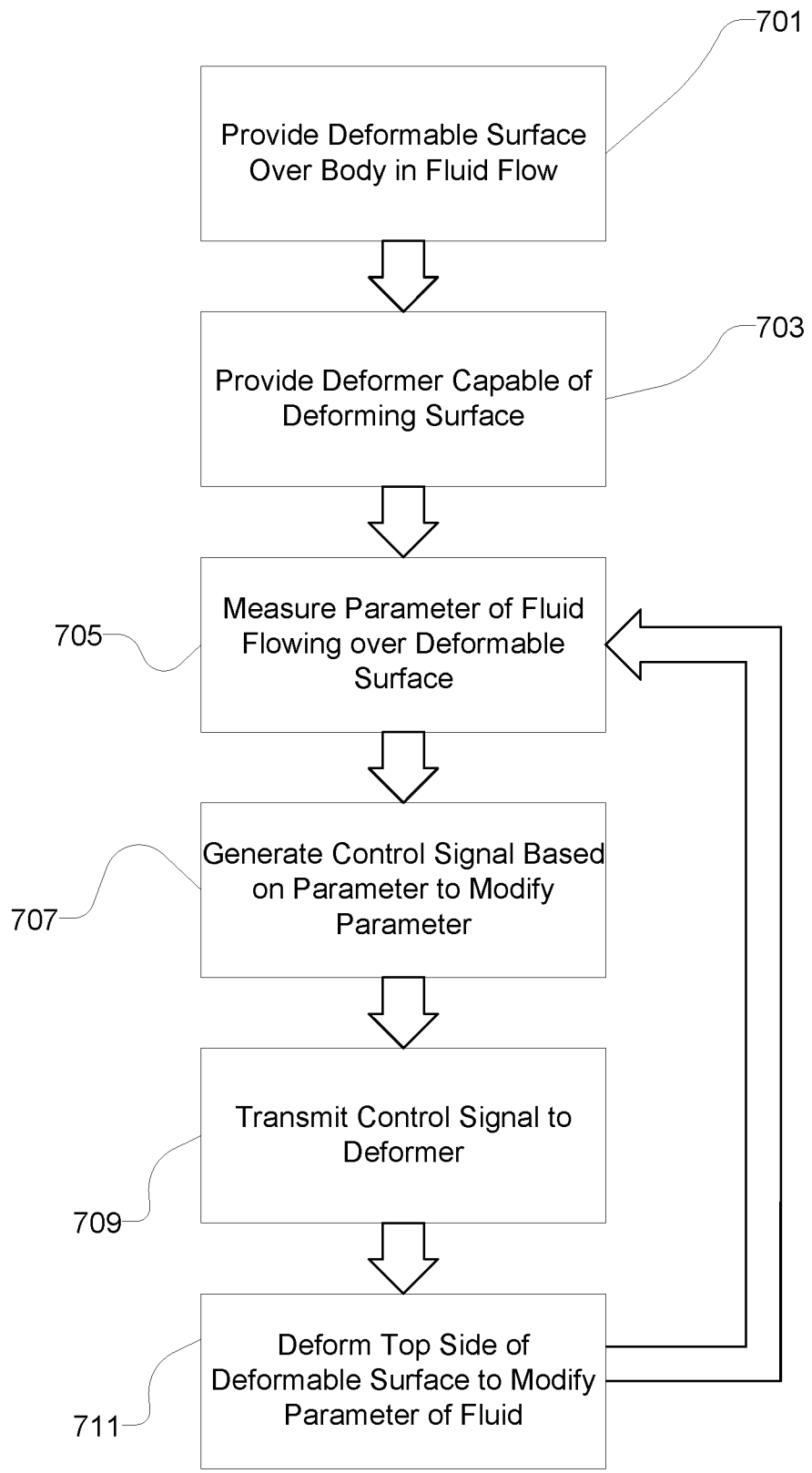
FIG. 10 is a flow diagram of a method for active control of surface drag according to an embodiment of the present disclosure.

Referring now to FIG. 10, a method 700 of active control of surface drag is depicted. The method can be performed using the fluid control system 100. At 701, a surface is provided over a body in fluid flow. The surface can be deformable. For example, the surface can be flexible.

At 703, a deformer capable of deforming the surface is provided. The deformer can be coupled to the surface, such as an underside of the surface between the surface and the body. Providing the deformer can include providing a plurality of deformers.

At 705, a parameter of the fluid flowing over the deformable surface is measured. The parameter may include the fluid flow velocity. For example, the parameter can include a velocity of fluid flow in a boundary layer of the fluid flowing over the deformable surface; the parameter can include a velocity of fluid flow in a free stream (free flow) beyond the boundary layer. The parameter can include at least one of a pressure or a temperature of the fluid. In some embodiments, the parameter includes a parameter of the body or a platform that includes the body, such as speed or fuel burn rate.

At 707, a control signal to modify the measured parameter is generated based on the measured parameter by a control circuit. For example, the control circuit can generate the control signal to achieve a target surface drag, fluid flow velocity, vehicle speed, vehicle fuel burn, or other parameter related to the surface drag of the fluid flowing over the deformable surface.

At 709, the control signal is transmitted to the deformer 709. Based on the control signal, the deformer selectively deforms the top side of the deformable surface to modify the parameter of the fluid 711.

As shown in FIG. 10, the control circuit can execute a control loop by iteratively measuring the parameter of the fluid flowing over the surface, and updating the control signal at each iteration to achieve a desired value of the measured parameter. For example, the control circuit can periodically calculate the velocity of the fluid flow, compare the calculated velocity to a target velocity, and modify the control signal (and thus the deformation of the deformable surface) to reduce the difference between the calculated velocity and the target velocity. In some embodiments, the control circuit can compare a current fuel burn rate of a vehicle that includes the body to a target fuel burn rate, and modify the control signal (and thus the deformation of the deformable surface) to reduce the difference between the current fuel burn rate and the target fuel burn rate.

B. Systems and Methods for Active Control of Surface Drag using Surface Oscillation Referring generally to FIGS. 11-15, a fluid control system is shown that can be used to actively control surface drag of a surface by generating oscillations of the surface, such as by causing portions of the surface to move within a plane of the surface. In some embodiments, the fluid control system includes a surface covering a body in at least a first and second direction. The first direction is orthogonal to the second direction. The surface includes a bottom side facing the body and a top side opposite the bottom side. The fluid control system includes at least one separate movable section on the top side of the surface. The at least one separate movable section is configured to modify a boundary layer of a fluid flowing over the surface by moving the at least one separate movable section along the top side of the surface. The fluid control system can selectively control surface drag over the surface by selectively moving the at least one separate movable section.

Figure 11:
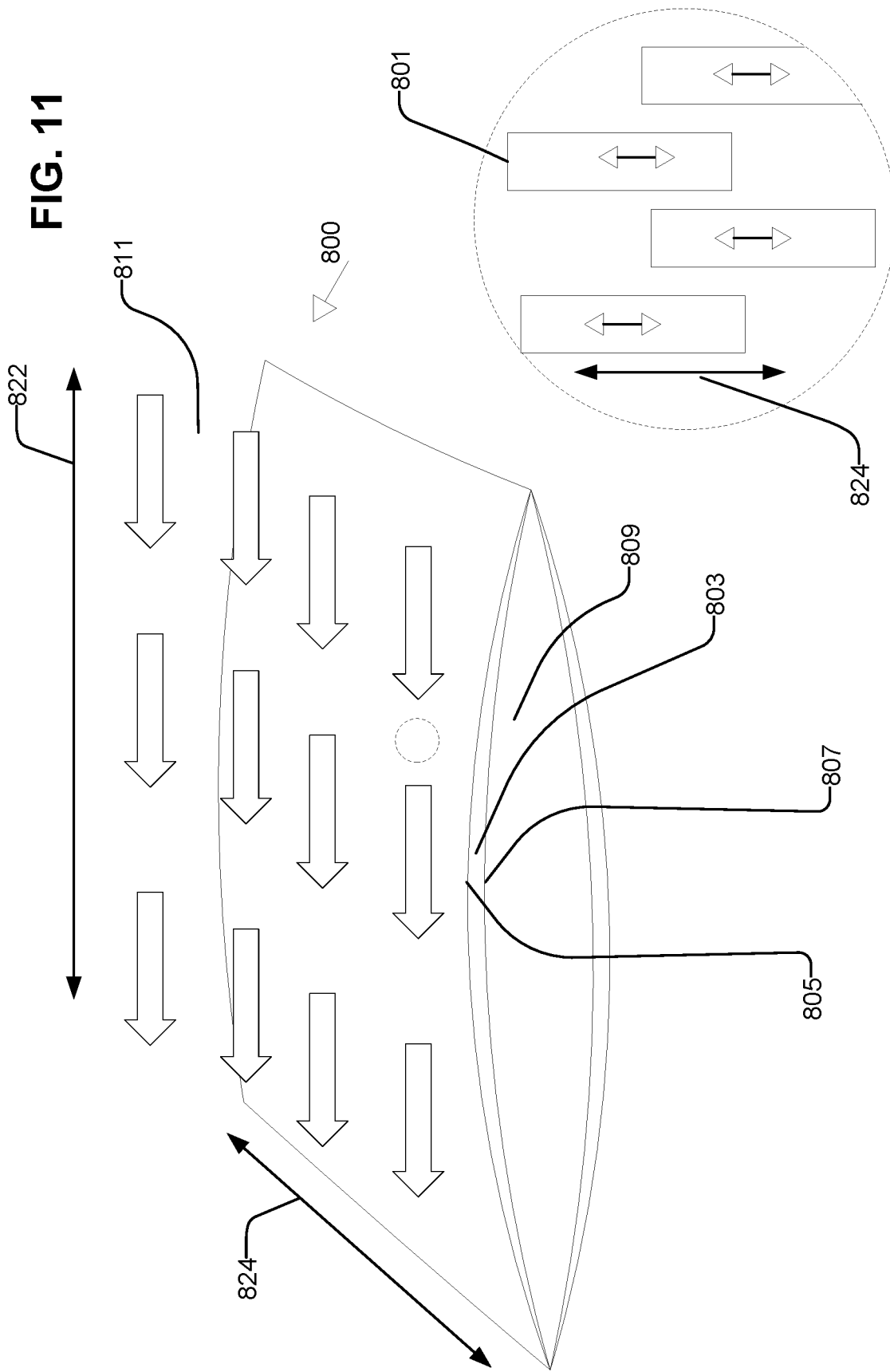
FIG. 11 is a schematic diagram of a fluid control system using separate movable sections according to an embodiment of the present disclosure.
Figure 12:
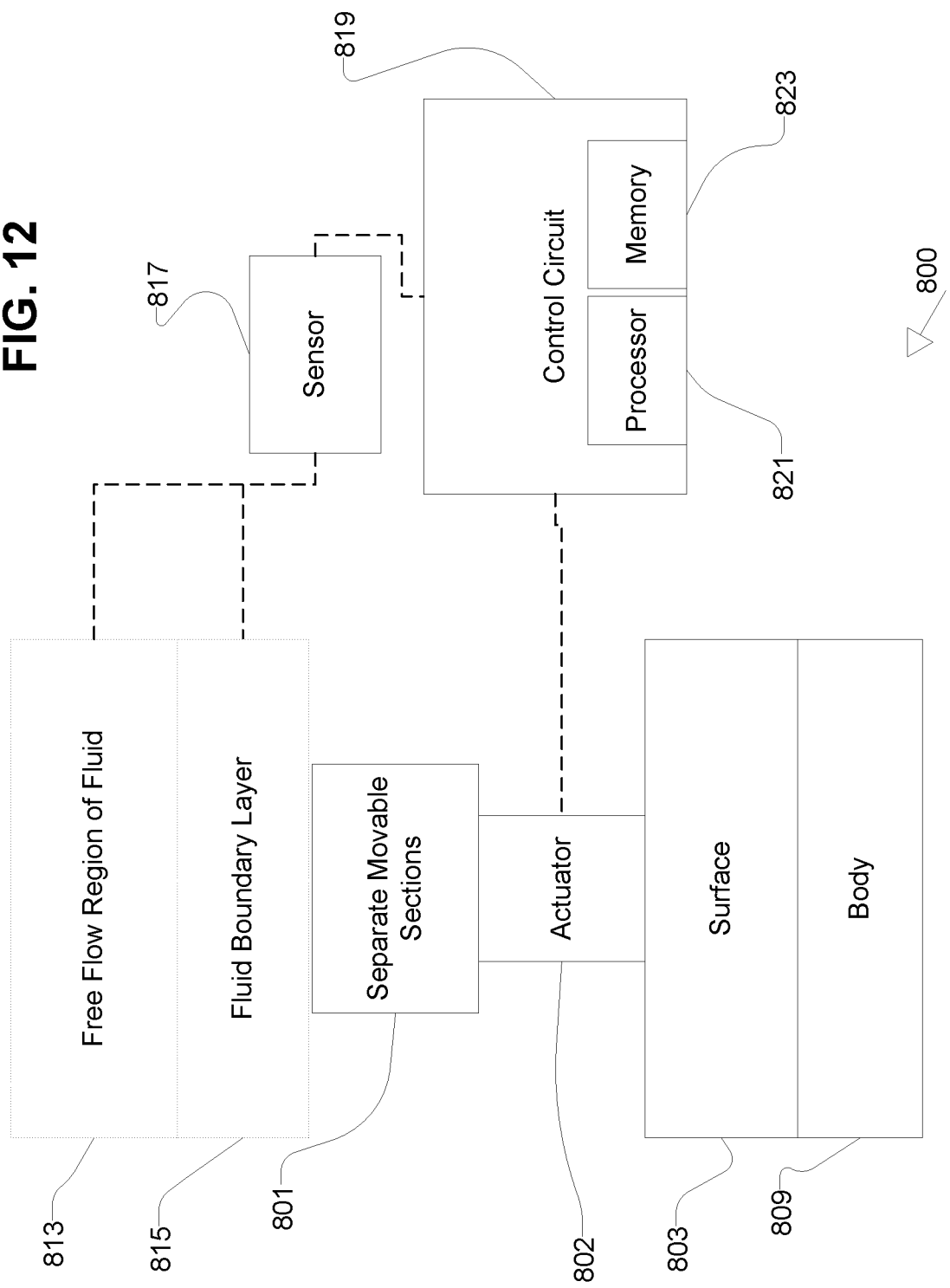
FIG. 12 is a block diagram of a fluid control system using separate movable sections according to an embodiment of the present disclosure.

Referring now to FIGS. 11-12, a fluid control system 800 using at least one separate movable section 801 is depicted. The surface 803 covers a body 809 in a first and second direction. The surface 803 has a bottom 807 that faces the body and a top 805 that is opposite the bottom side. The fluid 811 flows in a streamwise direction 822 over the top 805 of the surface 803, perpendicular to a spanwise direction 824.

The fluid control system 800 can be similar to the fluid control system 100, except that the fluid control system 800 modifies the fluid boundary layer 815 by moving the at least one separate movable section 801 parallel to the plane of the surface 803 in the spanwise direction 824, rather than by causing deformers to deform the surface 803 into and out of the plane of the surface 803. The streamwise or spanwise movement of the separate movable section(s) 801 can generate surface waves and oscillations, which can modify the fluid boundary layer 815. In some embodiments, a plurality of separate movable section(s) 801 are positioned along the surface 803 with gaps in between the separate movable section(s) 801.

In some embodiments, a first movable section 801 moves relative to a second movable section 801. For example, the first and second movable sections 801 may each be connected to actuators 802, which can drive the first and second movable sections 801 in opposing directions (e.g., opposing directions along streamwise direction 822 or spanwise direction 824). In some embodiments, the first movable section 801 is fixed, while the second movable section 801 moves relative to the fixed first movable section 801.

In various embodiments, the first movable section 801 may be coupled to the second movable section 801. For example, the movable sections 801 may be coupled by a fixed member. The movable sections 801 may be coupled by a spring member, which can facilitate surface wave generation by transmitting and/or damping movement forces amongst movable sections 801.

The movable sections 801 can vary in width. For example, widths of the movable sections 801 can be selected based on local flow conditions, such as to correlate the widths of the movable sections 801 to a parameter associated with local flow conditions. The parameter may include at least one of a Reynolds number, average flow rate, or boundary layer thickness of the fluid 811. As such, the surfaces waves generated by the movable sections 801 can be targeted to break up disturbances of the fluid 811, such as turbulent eddies, having specific dimensions.

Referring further to FIG. 12, the fluid control system 800 includes a sensor 817. The sensor 817 can be similar to the sensor 118 of the fluid control system 100. For example, the sensor 817 can detect the velocity of the fluid 811 at the fluid boundary layer 815.

The fluid control system 800 includes a control circuit 819. Similar to the control circuit 117 of the fluid control system 100, the control circuit 819 includes a processor 821 and memory 823. The control circuit 819 can control operation of the actuator(s) 802 and the separate movable section (s) 801 in order to move the at least one separate movable section(s) 801 and generate a surface wave to actively control surface drag associated with the fluid boundary layer 815. For example, the control circuit 819 can generate a control signal based on a parameter detected by sensor 817. The control circuit 819 can transmit the control signal to the actuator(s) 802 to move the separate movable section(s) to create surface waves. The control circuit 819 generates a control signal that specifies the relative speeds at which the actuator(s) 802 are to move the separate movable section(s) 801. In some embodiments, the control signal specifies the frequency of movement, the duration of movement, or the position that the separate movable section(s) 801 are moved to on the surface 803. The control circuit 819 can generate the control signal to cause the separate movable sections 801 to move in a manner to achieve a desired surface wave and/or modification to surface drag of the fluid 811.

Figure 13:
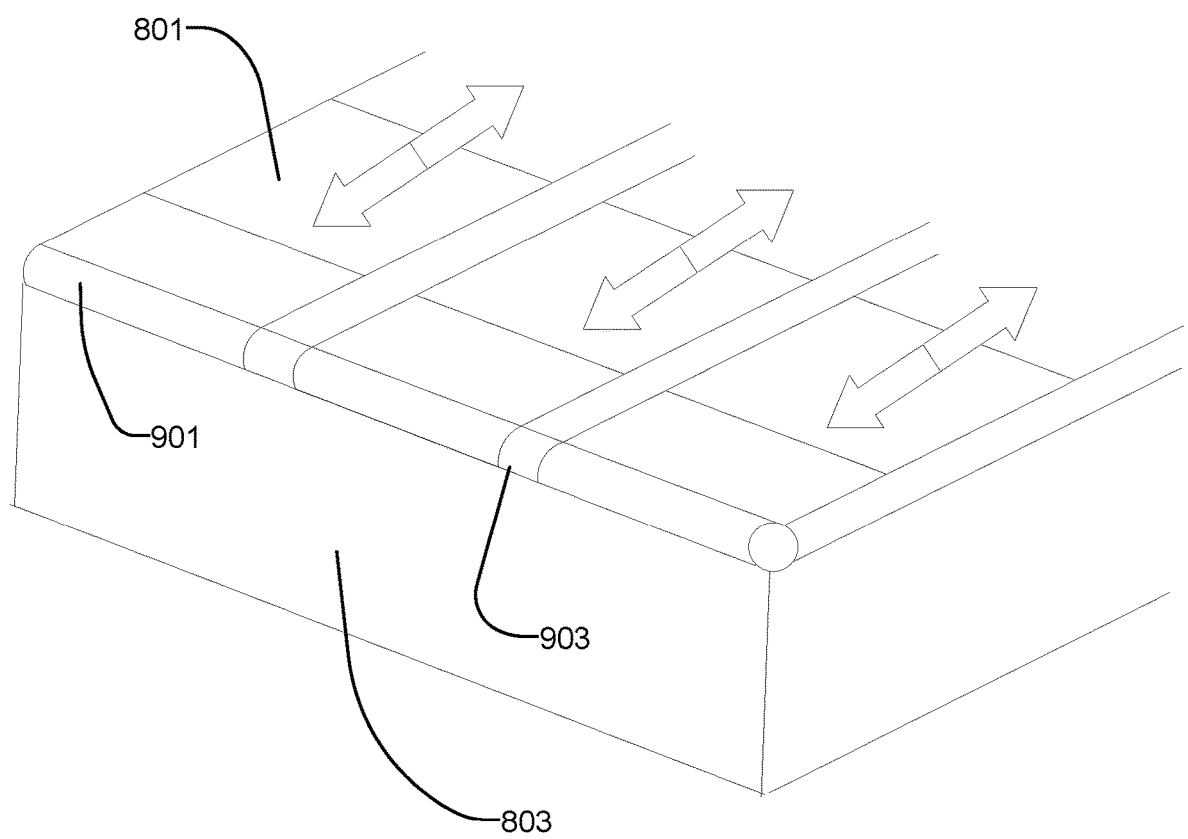
FIG. 13 is a schematic diagram of a fluid control system using separate movable sections moved by belts according to an embodiment of the present disclosure.

Referring now to FIG. 13, in some embodiments, the at least one actuator 802 can include at least one belt 901 that connects the separate movable section(s) 801 across the surface 803. In some embodiments, between each belt 901 is a gap 903. The at least one belt 901 can move the separate movable sections 801 in opposing directions. The at least one belt 901 can move the movable section(s) 801 at different velocities to obtain a discrete wave of speeds across the surface.

Figure 14:
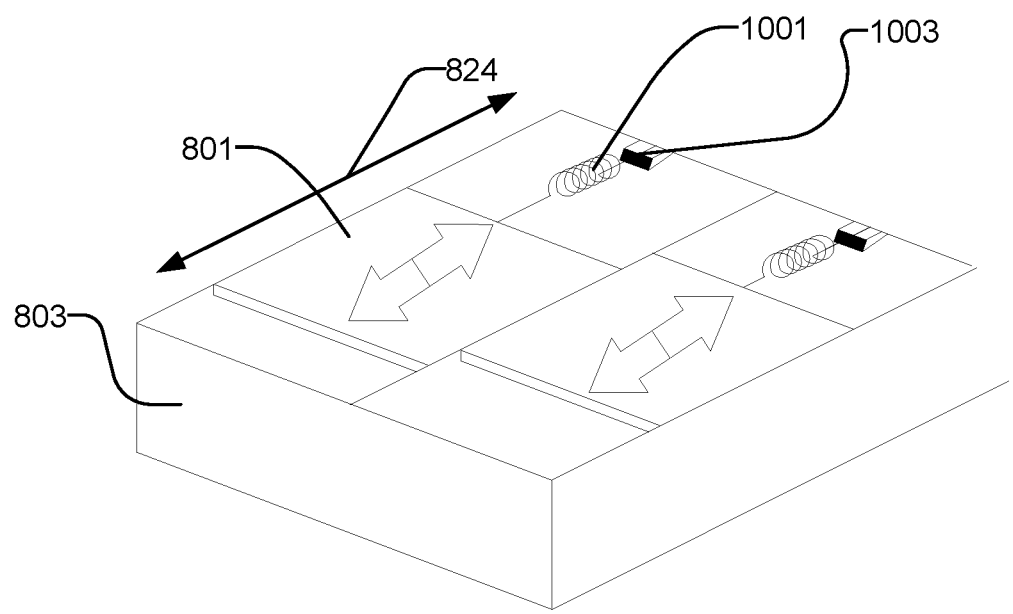
FIG. 14 is a schematic diagram of a fluid control system using separate movable sections moved by springs according to an embodiment of the present disclosure.

Referring now to FIG. 14, one or more springs 1001 can be attached to the separate movable section(s) 801. The at least one actuator can include at least one spring actuator 1003 that compresses and releases the spring(s) 1001 to move the separate movable section(s) 801 across the surface 803 in a streamwise or spanwise direction. The separate movable section(s) 801 can oscillate after the spring(s) 1001 are released by the at least one spring actuator 1003. This oscillatory motion can contribute to creating a surface wave to modify the boundary layer of the fluid flowing over the surface 803. In some embodiments, there is a gap between the separate movable sections 801. As noted above, the movable sections 801 can vary in width, so as to optimize drag reduction along the width or length of the surface 803.

Figure 15:
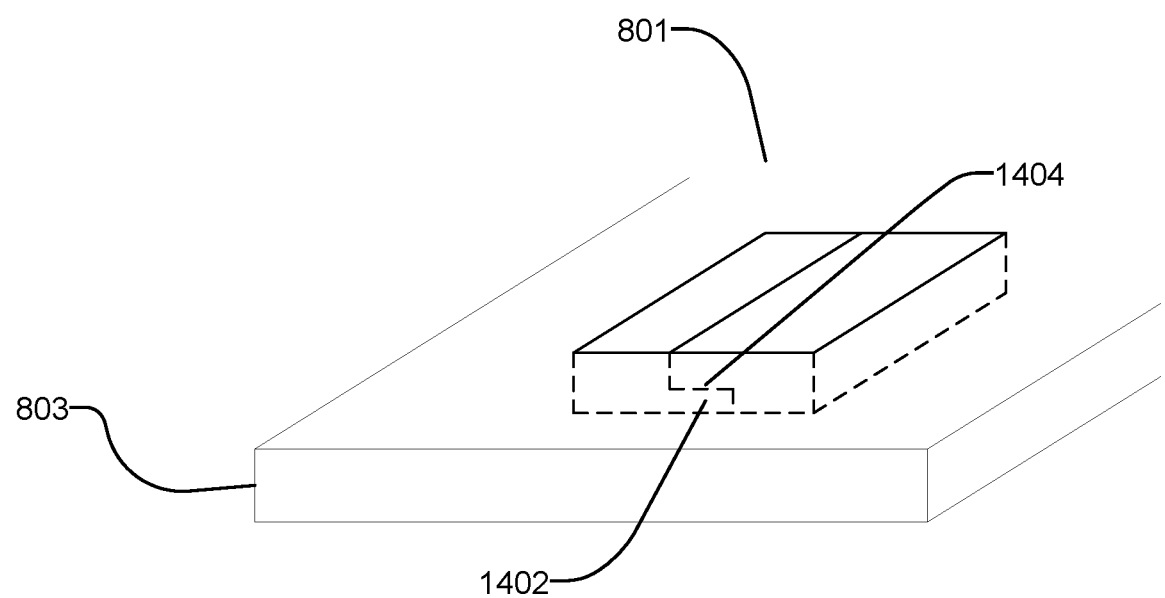
FIG. 15 is a schematic diagram of a fluid control system using interlocking movable sections according to an embodiment of the present disclosure.
Figure 17:
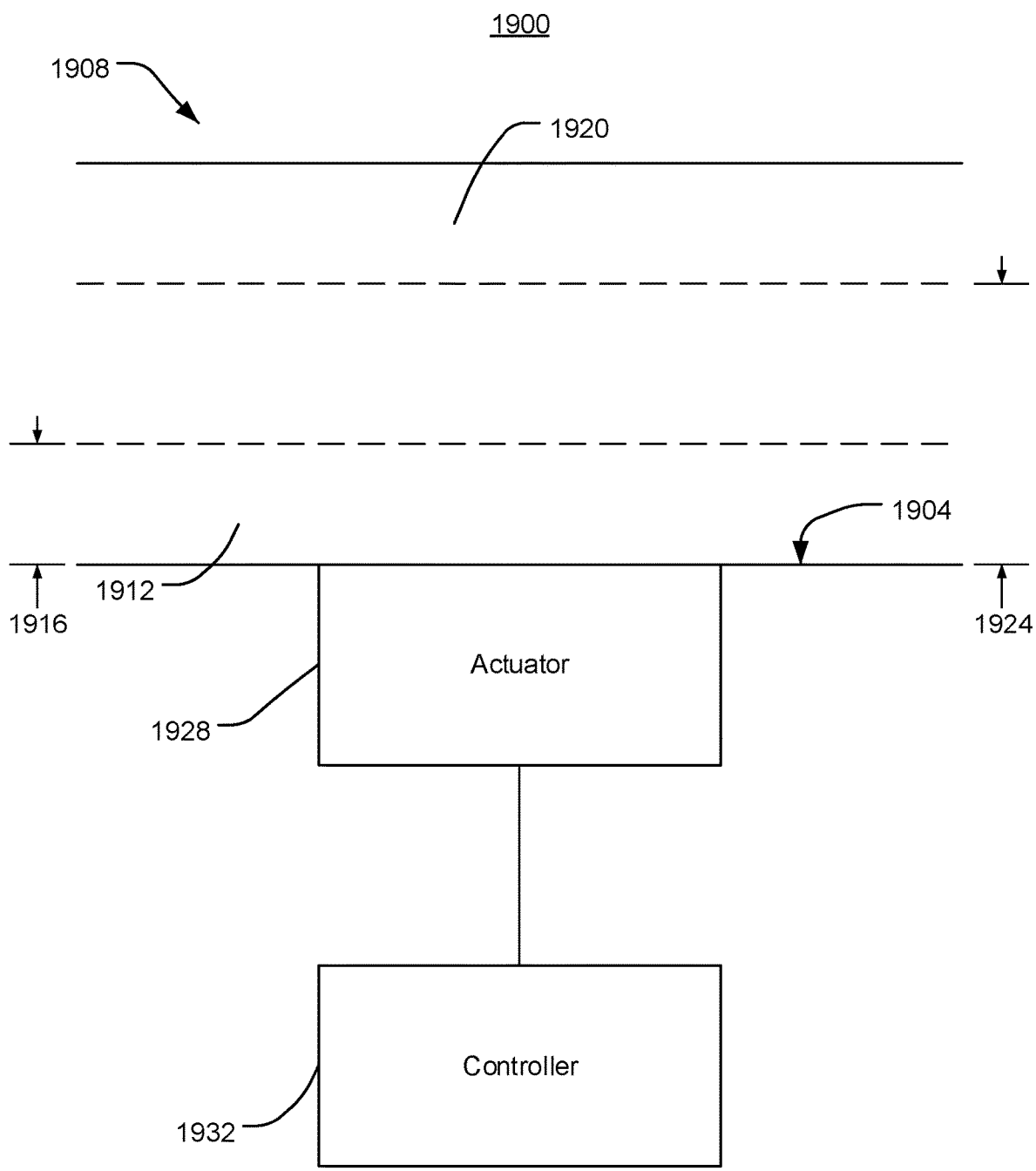
FIG. 17 is a block diagram of a fluid control system that actively controls surface drag using wall coupling according to an embodiment of the present disclosure.

Referring now to FIG. 15, in some embodiments, the separate movable sections 801 are interlocking. For example, as shown in FIG. 17, a first movable section 801 can include a first extension 1402 that at least partially extends adjacent to a second extension 1404 of a second movable section 801. In some embodiments, a gap (not shown) may be provided between movable sections 801 and thus extensions 1401, 1402. The gap may be minimally small, which can minimize airflow and/or drag between the sections 801.

Figure 16:
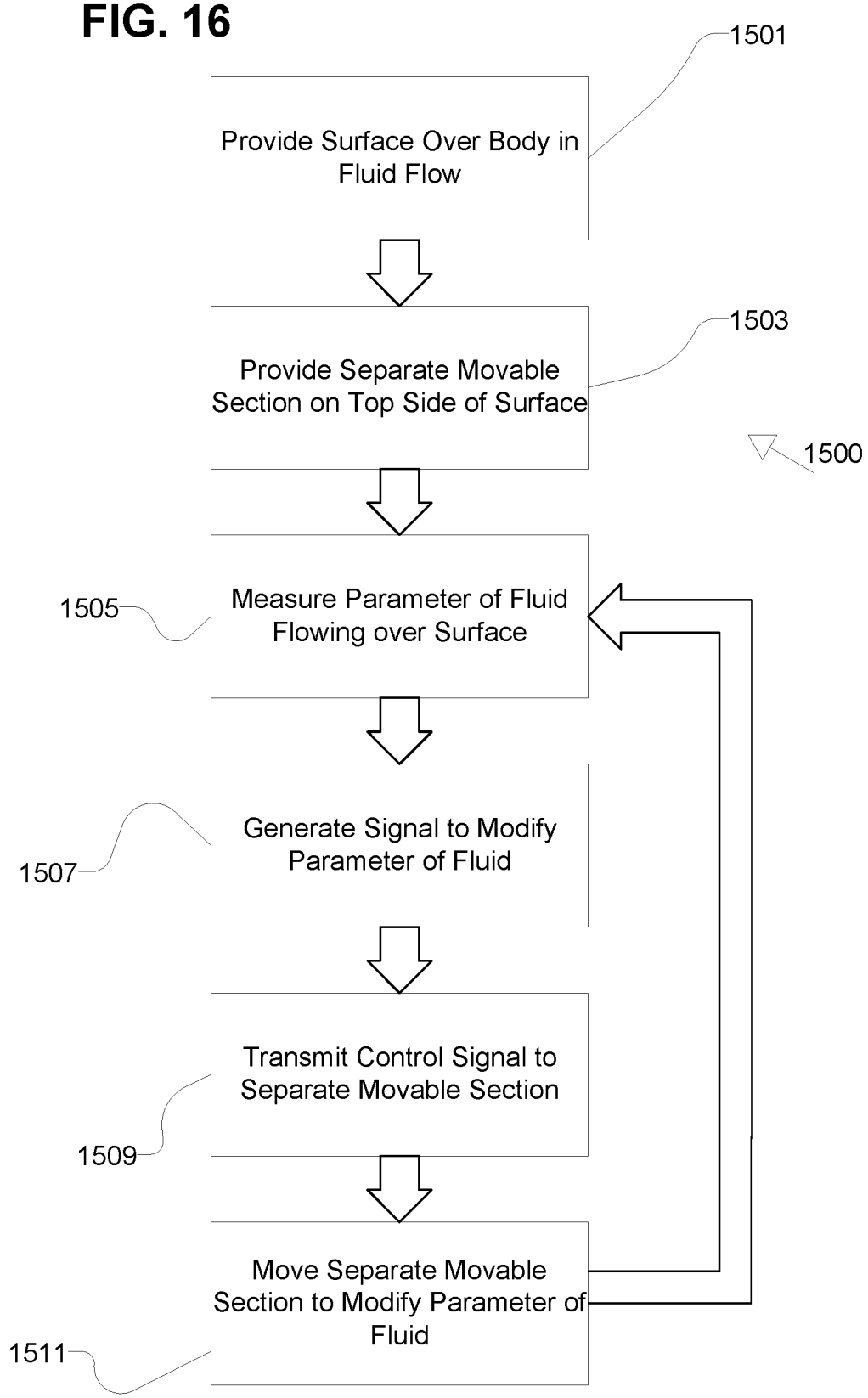
FIG. 16 is a flow diagram of a method for active control of surface drag according to an embodiment of the present disclosure.

Referring now to FIG. 16, a method 1500 of active control of surface drag is depicted. The method 1500 can be performed using the fluid control system 800. At 1501, a surface is provided over a body in fluid flow. The surface covers the body in at least two orthogonal directions and includes a bottom side facing the body and a top side opposite the bottom side.

At 1503, a separate movable section is provided. The separate movable section can move streamwise across the surface. A plurality of separate movable sections can be provided, which may have intermittent gaps. The separate movable sections can include belts, rotatable disks, or other components which can move across the deformable surface.

At 1505, a parameter of the fluid flowing over the deformable surface is measured. The parameter may include the fluid flow velocity. The parameter may include a temperature or pressure of the fluid.

At 1507, a control signal to modify the measured parameter is generated based on the measured parameter by a control circuit. For example, the control circuit can generate the control signal to modify operation of the separate movable sections to achieve a target surface drag, fluid flow velocity, vehicle speed, vehicle fuel burn, or other parameter related to the surface drag of the fluid flowing over the deformable surface.

At 1509, the control signal is transmitted to the separate movable section. Based on the control signal, at 1511 the separate movable section moves to modify the parameter of the fluid. For example, the separate movable section can move in a manner intended to modify a surface drag of the fluid as the fluid flows over the body.

As shown in FIG. 16, the control circuit can execute a control loop by iteratively measuring the parameter of the fluid flowing over the surface, and updating the control signal at each iteration to achieve a desired value of the measured parameter. For example, a sensor may measure the fluid flow velocity at the boundary layer. The sensor will transmit the measurement to the control circuit, which will compare it to the desired fluid flow velocity at the boundary layer. If the measured fluid flow velocity is lower than the desired fluid flow velocity, then the control circuit will generate a control signal that will result in the separate movable sections moving to increase the fluid flow velocity. If the measured fluid flow velocity is higher than the desired fluid flow velocity, then the control circuit will generate a control signal that will result in the separate movable sections moving to decrease the fluid flow velocity. After the control signal is transmitted to the separate movable section, the sensor measures the fluid flow velocity at the boundary layer again and the feedback loop is continued. In some embodiments, the sensor will measure the velocity of the body through the fluid and transmit the measurement to the control circuit, which will compare it to the desired velocity of the body. If the velocity of the body is lower than the desired velocity, the control circuit will generate a control signal that will result in the separate movable sections moving to increase the velocity of the body by decreasing surface drag. If the velocity of the body is higher than the desired velocity, the control circuit will generate a control signal that will result in the separate movable sections moving to decrease the velocity of the body by increasing surface drag. After the control signal is followed, the sensor measures the velocity of the body again and the feedback loop is continued.

C. Systems and Methods of Active Control of Surface Drag using Wall Coupling

Figure 18:
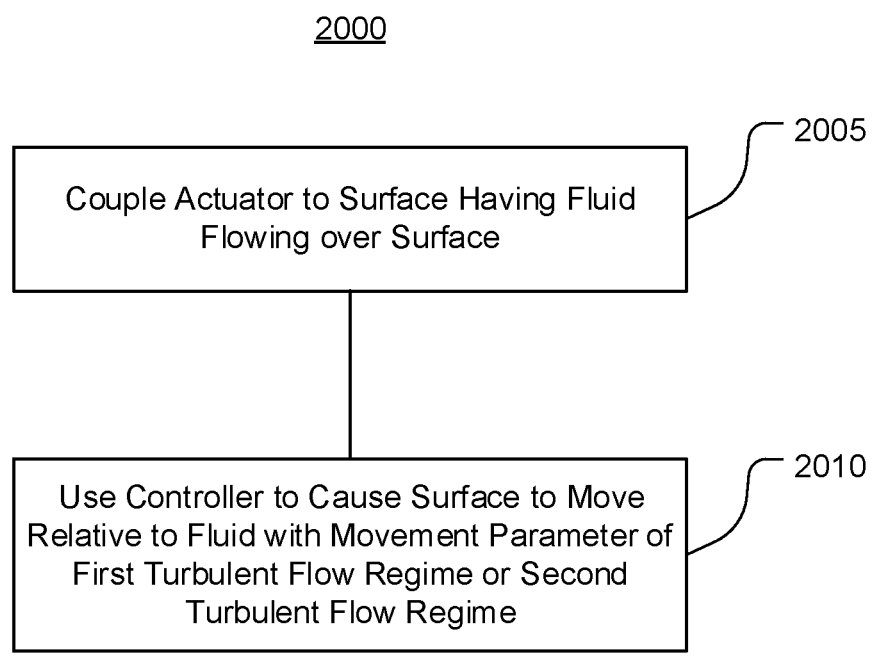
FIG. 18 is a flow diagram of a method of actively controlling surface drag using wall coupling according to an embodiment of the present disclosure.

Referring generally to FIGS. 17-18, fluid control systems and methods in accordance with the present disclosure can be used to control drag by modifying fluid flow in one or more flow regimes, such as to modify fluid flow in a first flow regime adjacent to the surface, which may also cause resulting changes in fluid flow in a second flow regime. The flow regimes may be characterized based on various parameters, including but not limited to Reynolds number, distance from the surface, or turbulent eddy size. In some embodiments, a system includes a surface having a fluid flowing over the surface, the fluid including a first turbulent flow regime within a first distance of the surface and a second turbulent flow regime at least a second distance from the surface, the second distance greater than the first distance, an actuator coupled to the surface to move the surface relative to the fluid, and a controller that causes the actuator to cause the surface to move with a movement parameter corresponding to a flow parameter of at least one of the first turbulent flow regime or the second turbulent flow regime. Fluid control systems and methods in accordance with the present disclosure can selectively control turbulent motions on particular size and time scales (e.g., motions of 100 to 10000 viscous units in streamwise length with normalized time scales of 10 to 1000 viscous time units as described further herein). Fluid control systems and methods in accordance with the present disclosure can reduce power requirements for causing desired drag changes by tuning surface wave generation in a manner that can affect turbulence in the second flow regime based on interaction with the wall-side first flow regime.

Referring now to FIG. 17, a fluid control system 1900 is depicted. The fluid control system 1900 includes a surface 1904 having a fluid 1908 flowing over the surface 1904. The fluid 1908 includes a first turbulent flow regime 1912 within a first distance 1916 of the surface 1904, and a second turbulent flow regime 1920 at least a second distance 1924 away from the surface 1904, the second distance greater than or equal to the first distance 1916. The first and second turbulent flow regimes 1912, 1920 may be turbulent based on having a Reynolds number greater than a threshold Reynolds number. The threshold Reynolds number may be a function of geometry of the surface 1904. In some embodiments, the surface 1904 includes a film, which may cover an inner surface (e.g., of a pipe) over which the fluid flows, or an outer surface of a platform, such as a movable platform.

The fluid control system 1900 includes an actuator 1928 coupled to the surface 1904. The actuator 1928 can move the surface 1904 relative to the fluid 1908. For example, the actuator 1928 can generate surface waves that modify drag in the first turbulent flow regime 1912 which in turn modifies drag in the second turbulent flow regime 1920.

The fluid control system 1900 includes a controller 1932 that controls operation of the actuator 1928. The controller 1932 can cause the actuator 1928 to cause the surface 1904 to move with a movement parameter corresponding to a flow parameter of at least one of the first turbulent flow regime 1912 or the second turbulent flow regime 1920. In some embodiments, the movement parameter includes a frequency of movement of the surface 1904, and the flow parameter includes a size parameter of a turbulent eddy of the at least one of first turbulent flow regime 1912 or the second turbulent flow regime 1920. As such, the controller 1932 can control the drag response of the turbulent flow regimes 1912, 1920 by controlling the movement parameter of the surface 1904. In some embodiments, the controller 1932 includes a noise component in a control signal provided to the actuator 1928 to control operation of the actuator 1928, which can facilitate drag modification by more effectively interfering with turbulent eddies.

In some embodiments, the fluid control system 1900 includes at least one sensor 1936. The at least one sensor 1936 can detect characteristics of the fluid 1908 and/or the surface 1904. In some embodiments, the sensor 1936 includes a pressure sensor that detects a pressure of the fluid 1908. In some embodiments, the sensor 1936 includes a temperature sensor that detects a temperature of the fluid 1908. The sensor 1936 can include a flow meter that detects at least one of a flow rate or a velocity of the fluid 1908. In some embodiments, the controller 1932 uses the detected characteristic(s) to calculate a Reynolds number of the fluid 1908.

In some embodiments, the surface 1904 extends along a length including an upstream point and a downstream point. The actuator 1928 can be coupled to the downstream point. The sensor 1936 can detect the characteristic of the fluid 1908 proximate to the upstream point, and the controller can use the detected characteristic at the upstream point to cause the actuator 1928 to move the surface 1904 at the downstream point based on the detected characteristic.

In some embodiments, the actuator 1928 includes a plurality of first actuators in a first layer and a plurality of second actuators in a second layer. The controller 1932 can use the plurality of first actuators to cause the surface 1904 to generate a first wave having a first frequency and a first amplitude, and use the plurality of second actuators to cause the surface 1904 to generate a second wave having a second frequency and a second amplitude. The first frequency can be greater than or less than the second frequency. The first amplitude can be greater than or less than the second amplitude.

In some embodiments, the controller 1932 causes the actuator 1928 to adjust flow as a function of position in the second turbulent flow regime 1920 to generate a force on the surface 1904. For example, the controller 1932 vary frequency, amplitude, or other parameters of operation of each of a plurality of actuators 1928 based on position.

Referring now to FIG. 18, a method 2000 of active control of surface drag using wall coupling is depicted. The method 2000 can be performed using various systems described herein, including the fluid control system 1900.

At 2005, an actuator is coupled to a surface having a fluid flowing over the surface. The fluid includes a first turbulent flow regime within a first distance of the surface and a second turbulent flow regime at least a second distance from the wall, the second distance greater than the first distance. The actuator can include a plurality of actuators, which may be in layers and may be independently controlled based on parameters such as frequency and amplitude.

At 2010, a controller causes the actuator to cause the surface to move relative to the fluid with a movement parameter corresponding to a flow parameter of at least one of the first turbulent flow regime or the second turbulent flow regime. The movement parameter can include a frequency of movement of the surface. The flow parameter can include a size parameter of a turbulent eddy of the second turbulent flow regime. In some embodiments, the controller controls operation of the actuator based on data received from a sensor, such as temperature, pressure, flow rate, and/or velocity data. In some embodiments, the controller causes the actuator to adjust flow as a function of position in the second turbulent flow regime to generate a force on the surface. In some embodiments, the controller includes a noise component in a control signal provided to the actuator to control operation of the actuator.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fluid control systems and methods of fluid control as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for controlling drag caused by fluid flowing over one or more bodies, comprising:
    measuring one or more of a velocity, a viscosity, or a pressure of a fluid flowing over a surface of the one or more bodies;
    determining a streamwise length scale of at least one flow regime of the fluid based on the measured one or more velocity, viscosity, or pressure, wherein the streamwise length scale is between about 100 times $\eta$ and about 10,000 times $\eta$, where $\eta$ is a viscous length scale of the at least one flow regime;
    determining a convective time scale of the at least one flow regime based on the measured one or more velocity, viscosity, or pressure, wherein the convective time scale has a duration of greater than about $10\eta'$ and less than about $1,000\eta'$, wherein $\eta'$ is a viscous time scale of the at least one flow regime; and
    outputting a control signal that is based at least in part on both the streamwise length scale and the convective time scale to at least one deformer coupled to the surface to cause a substantially in-plane deformation of the surface in a spanwise direction relative to the flow of the fluid to modify fluid flow in the at least one flow regime of the fluid.

2. The method of claim 1, wherein measuring the one or more velocity, viscosity, or pressure of the fluid comprises measuring the one or more velocity, viscosity, or pressure using at least one sensor.

3. The method of claim 1, further comprising providing one or more structures on the surface, the one or more structures having a structure length scale corresponding to the streamwise length scale.

4. The method of claim 1, wherein the surface forms a portion of a moving body.

5. The method of claim 1, wherein the surface forms a portion of a non-moving body along which the fluid flows.

6. The method of claim 1, wherein outputting the control signal comprises outputting the control signal such that the at least one deformer generates the substantially in-plane deformation with a target frequency, target wavelength, target duration, or target intermittency of deformations.

7. The method of claim 1, further comprising causing the deformation of the surface based on a turbulent eddy size of the fluid.

8. The method of claim 1, further comprising causing the deformation to achieve a target value of surface drag of the fluid on the surface.

9. A system, comprising:
a sensor that measures one or more of a velocity, a viscosity, or a pressure, of a fluid flowing over a surface of one or more bodies; and
a controller that:
determines a streamwise length scale and a convective time length scale of at least one flow regime of the fluid based on the measured one or more velocity, viscosity, or pressure, wherein the streamwise length scale is between about 100 times $\eta$ and about 10,000 times $\eta$, wherein $\eta$ is a viscous length scale of the at least one flow regime, wherein the convective time scale has a duration of greater than about $10\eta'$ and less than about $1,000\eta'$, wherein $\eta$ is a viscous time scale of the at least one flow regime; and
outputs a control signal that is based at least in part on both the streamwise length scale and convective time scale to at least one deformer coupled to the surface to cause a substantially in-plane deformation of the surface in a spanwise direction relative to the flow of the fluid to modify fluid flow.

10. The system of claim 9, wherein the controller outputs the control signal by outputting the control signal such that the at least one deformer generates the substantially in-plane deformation with a target frequency, wavelength, duration, or intermittency of deformation.

11. The system of claim 9, further comprising:
one or more structures coupled with the surface, the one or more structures having a structure length scale corresponding to the streamwise length scale.

12. The system of claim 9, wherein the surface forms a portion of a moving body.

13. The system of claim 9, wherein the surface forms a portion of a non-moving body along which the fluid flows.

14. The system of claim 9, wherein the controller outputs the control signal by outputting the control signal such that the at least one deformer generates the substantially in-plane deformation with a target frequency, target wavelength, target duration, or target intermittency of deformations.

15. The system of claim 9, wherein the controller is configured to cause the deformation of the surface based on a turbulent eddy size of the fluid.

16. The system of claim 9, wherein the controller is configured to cause the deformation of the surface to achieve a target value of surface drag of the fluid on the surface.

17. A system, comprising:
a sensor that measures one or more of a velocity, a viscosity, or a pressure, of a fluid flowing over a surface of one or more bodies; and
a controller that:
determines a streamwise length scale of at least one flow regime of the fluid based on the measured one or more velocity, viscosity, or pressure, wherein the streamwise length scale is between about 100 times $\eta$ and about 10,000 times $\eta$, wherein $\eta$ is a viscous length scale of the at least one flow regime;
determines a convective time scale of the at least one flow regime based on the measured one or more velocity, viscosity, or pressure, wherein the convective time scale has a duration of greater than about $10\eta'$ and less than about $1,000\ \eta'$, wherein $\eta'$ is a viscous time scale of the at least one flow regime; and
outputs a control signal that is based at least in part on both the streamwise length scale and the convective time scale to at least one deformer coupled to the surface to cause a substantially in-plane deformation of the surface in a spanwise direction relative to the flow of the fluid to modify fluid flow in the at least one flow regime of the fluid.

18. The system of claim 17, further comprising:
one or more structures coupled with the surface, the one or more structures having a structure length scale corresponding to the streamwise length scale.

19. The system of claim 17, wherein the controller outputs the control signal by outputting the control signal such that the at least one deformer generates the substantially in-plane deformation with a target frequency, target wavelength, target duration, or target intermittency of deformations.

20. The system of claim 17, wherein the controller is configured to cause the deformation of the surface based on a turbulent eddy size of the fluid.

* * * * *